(12) United States Patent
Sharifi et al.

(10) Patent No.: US 11,935,519 B2
(45) Date of Patent: Mar. 19, 2024

(54) PRESERVING SPEECH HYPOTHESES ACROSS COMPUTING DEVICES AND/OR DIALOG SESSIONS

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 107 days.

(21) Appl. No.: 16/949,151

(22) Filed: Oct. 15, 2020

(65) Prior Publication Data

US 2022/0122589 A1 Apr. 21, 2022

(51) Int. Cl.
*G10L 15/00* (2013.01)
*G10L 15/14* (2006.01)
(Continued)

(52) U.S. Cl.
CPC ............. *G10L 15/14* (2013.01); *G10L 15/22* (2013.01); *G10L 15/26* (2013.01)

(58) Field of Classification Search
CPC ......... G10L 15/22; G10L 15/14; G10L 15/16; G10L 15/18; G10L 15/083; G10L 15/08; G10L 2015/221; G10L 15/222; G10L 2015/225; G10L 15/26; G10L 15/00; G10L 15/20; G10L 15/30; G10L 15/065; G10L 15/1815; G06F 3/167; G06F 3/0482; G06F 3/04842; G06N 7/005; G06N 20/00
See application file for complete search history.

(56) References Cited

U.S. PATENT DOCUMENTS 7,899,671 B2 * 3/2011 Cooper ................. G10L 15/065
704/251
8,862,467 B1 10/2014 Casado et al.
(Continued)

FOREIGN PATENT DOCUMENTS

EP 3693837 A1 * 8/2020 ............... G06F 3/01

OTHER PUBLICATIONS

European Patent Office; Invitation to Pay Additional Fees; Ser. No. PCT/US2020/064933; 11 pages; dated Jul. 13, 2021.
(Continued)

*Primary Examiner* — Michael Ortiz-Sanchez
(74) *Attorney, Agent, or Firm* — Gray Ice Higdon

(57) ABSTRACT

Implementations can receive, at a computing device, audio data corresponding to a spoken utterance of a user, process the audio data to generate, for one or more parts of the spoken utterance, a plurality of speech hypotheses, select a given one of the speech hypotheses, cause the given one of the speech hypotheses to be incorporated as a portion of a transcription associated with the software application, and store the plurality of speech hypotheses. In some implementations, the plurality of speech hypotheses can be loaded at an additional computing device when the transcription is accessed at the additional computing device. In additional or alternative implementations, the plurality of speech hypotheses can be loaded into memory of the computing device when the software application is reactivated and/or when a subsequent dialog session associated with the transcription is initiated.

18 Claims, 13 Drawing Sheets

(51) Int. Cl.
    *G10L 15/22*    (2006.01)
    *G10L 15/26*    (2006.01)

(56) References Cited

U.S. PATENT DOCUMENTS

| | | |
|---|---|---|
| 9,384,188 B1 | 7/2016 | Levit et al. |
| 9,953,646 B2 * | 4/2018 | Sadkin .................. G10L 15/187 |
| 11,295,745 B1 * | 4/2022 | Roy ......................... G06F 3/167 |
| 2006/0009980 A1 * | 1/2006 | Burke ..................... G10L 15/30 |
| | | 704/E15.047 |
| 2017/0061956 A1 | 3/2017 | Sarikaya et al. |
| 2019/0122657 A1 * | 4/2019 | James ..................... G06F 40/30 |
| 2022/0399021 A1 * | 12/2022 | Asai ........................ G06F 40/56 |

OTHER PUBLICATIONS

European Patent Office; International Search Report and Written Opinion of Ser. No. PCT/US2020/064933; 17 pages; dated Sep. 3, 2021.

\* cited by examiner

PRESERVING SPEECH HYPOTHESES ACROSS COMPUTING DEVICES AND/OR DIALOG SESSIONS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) to an automated assistant, which may in some cases be converted into text and then processed, and/or by providing textual (e.g., typed) natural language input. An automated assistant generally responds to the spoken utterances by dictating the spoken utterances, providing responsive user interface output (e.g., audible and/or visual user interface output), controlling smart device(s), and/or performing other action(s).

Automated assistants typically rely upon a pipeline of components in interpreting and responding to user requests. For example, an automatic speech recognition (ASR) engine can be used to process audio data that correspond to a spoken utterance, and to generate a transcription (i.e., sequence of term(s) and/or other token(s)) of the spoken utterance. However, in performing ASR, certain term(s) may be misrecognized. As a result, the transcription may include term(s) not intended by the user. This can cause the user to repeat the same spoken utterance (which may be misrecognized again) or cause the user to manually edit the misrecognition, thereby prolonging the human-to-computer dialog and/or causing the user to consume additional computational resources beyond the human-to-computer dialog.

SUMMARY

Implementations disclosed herein relate to preserving speech hypotheses across computing devices and/or dialog sessions. For example, in response to receiving a spoken utterance of "text Jane and tell her I like the new house" from a user of a computing device, speech recognition can be performed on the spoken utterance. In performing speech recognition, multiple term hypotheses can be generated for one or more portions of the spoken utterance. This, in turn, results in a plurality of transcription hypotheses being generated. In this example, assume that multiple term hypotheses are generated for the portion of speech corresponding to "house", such as "blouse", "house", and "mouse". This results in multiple transcription hypotheses for the text message, such as "I like the new blouse", "I like the new house", etc. A given transcription hypothesis, of the plurality of transcription hypotheses, can be selected as corresponding to the spoken utterance utilizing one or more techniques. For example, assume that the selected transcription speech hypothesis corresponds to "I like the new blouse" (rather than "house" as the user intended). The selection of the term hypothesis "blouse" over the term hypothesis "house" in this example represents a misrecognition in speech recognition for the given transcription hypothesis. As a result of the misrecognition, a transcription rendered at the computing device based on the transcription hypothesis does not correspond to the spoken utterance. Nonetheless, the term hypotheses and/or the transcription hypotheses can be stored in memory that is accessible by the computing device. The term hypotheses and/or the transcription hypotheses can be subsequently loaded at the computing device or an additional computing device of the user.

As one example, further assume additional user input is received at the additional computing device that is distinct from the computing device where the original spoken utterance was received. In this example, the term hypotheses and/or the transcription hypotheses can be subsequently loaded at the additional computing device in response to the additional user input being received at the additional computing device, and optionally in response to determining that the additional user input is directed to the software application that is associated with the transcription and/or in response to determining that the additional user input is directed to the transcription itself. As another example, further assume additional user input is received at the computing device where the original spoken utterance was received. In this example, the term hypotheses and/or the transcription hypotheses can be subsequently loaded at the computing device in response to the additional user input being received at the computing device as part of a subsequent dialog session, and optionally in response to determining that the additional user input is directed to the software application that is associated with the transcription and/or in response to determining that the additional user input is directed to the transcription itself. In some of these examples, potentially misrecognized portions of the spoken utterance can optionally be graphically demarcated in the transcription to indicate alternate speech hypotheses are available for the potentially misrecognized portions of the spoken utterance. In some other of these examples, the potentially misrecognized portions of the spoken utterance may not be provided to the user until the user interacts with the potentially misrecognized portion of the transcript (e.g., via a longpress at a computing device that includes a touchscreen, via a right-click or hover action at computing devices that include a stylus or mouse, via a virtual keyboard interaction). Further, the potentially misrecognized portions of the spoken utterance can be modified automatically based on further user input detected at the computing device or the additional computing device.

Accordingly, the plurality of speech hypotheses generated for the original spoken utterance can be preserved across computing devices and/or dialog sessions. By preserving the plurality of speech hypotheses across the computing devices and/or across the dialog sessions, potentially misrecognized portions of the original spoken utterance can be flagged for the user of the computing devices and/or automatically corrected across the computing devices and/or the dialog sessions (and optionally in response to the user interacting with the portion of the transcription that includes the potential misrecognition). In these and other manners, misrecognitions can be identified and corrected in a manner that reduces a length of the human-to-computer dialog between the user and one or more of the computing devices (or an automated assistant implemented thereon), thereby conserving computational and/or network resources. Further, a quantity of user inputs received at one or more of the computing devices can be reduced in that one or more of the computing devices (or an automated assistant implemented thereon) can automatically correct these potential misrecognitions or notify the user of these potential recognitions, and the user need not manually correct any potential misrecognitions (and optionally in response to the user interacting with the portion of the transcription that includes the potential misrecognition). For example, absent these techniques, the user would have to manually delete portions of the transcription, and manually add new portions to the transcription, whereas the techniques described herein enable "one-click" corrections for misrecognized portions of the transcription. Moreover, in implementations where the transcription is a portion of a message (e.g., an email message, a text message, and/or other types of messages) that is transmitted over one or more networks to other users, computational and/or network resources can be conserved in that an additional message to correct misrecognitions in the original message need not be generated by one or more of the computing devices or transmitted to the other users.

In some implementations, audio data that captures a spoken utterance can be processed, using automatic speech recognition (ASR) model(s), at a computing device that detected the audio data (e.g., via microphone(s) thereof). In some additional and/or alternative implementations, the audio data (or features derived therefrom) can be transmitted to a remote computing system (e.g., server(s)) over one or more networks, and processed, using ASR model(s), remotely at the remote computing system. In processing the audio data, a plurality of speech hypotheses (including term hypotheses and/or transcription hypotheses) can be generated using the speech recognition model(s) (e.g., as direct output from processing using the speech recognition model(s) and/or by post-processing of such output (e.g., using a finite state decoding graph)), and each of the plurality of speech hypotheses can be associated with a respective confidence level corresponding to a likelihood that a given speech hypothesis corresponds to the spoken utterance or part(s) thereof. A given speech hypothesis, of the plurality of speech hypotheses, can be selected as corresponding to the spoken utterance based on the respective confidence levels (e.g., determined directly based on the respective confidence level and/or based on the respective confidence levels associated with the finite state decoding graph), and incorporated as part of a transcription that is associated with a software application (e.g., an automated assistant application, an email application, a text messaging application, and/or other software applications accessible by at least the computing device).

Further, the plurality of speech hypotheses for a given spoken utterance can be stored in memory that is accessible by one or more of the computing devices of the user. For example, assume a spoken utterance of "I like the new house" is received for dictation in a text messaging application. In this example, a first transcription hypothesis of "I like the new blouse" (including a first term hypothesis of "blouse") can be generated along with first respective confidence level(s) (e.g., associated with the first transcription hypothesis and/or the first term hypothesis), a second transcription hypothesis of "I like the new house" (including a second term hypothesis of "house") can be generated along with second respective confidence level (s) (e.g., associated with the second transcription hypothesis and/or the second term hypothesis), and so on. Further assume that the transcription hypothesis of "I like the new blouse" (e.g., including the misrecognized term "blouse") is selected as corresponding to the spoken utterance, and a transcription is generated for the text messaging application that includes the misrecognition.

In some implementations, the plurality of speech hypotheses can be stored in memory that is accessible by at least the computing device. The memory that is accessible by the computing device can be, for example, on-device memory (e.g., RAM or ROM) of one or more of the computing devices, and/or remote memory of or more of remote systems (e.g., cloud-based memory). The plurality of speech hypotheses can be stored in the memory in associated with the respective confidence levels and/or the finite state decoding graph for the spoken utterance that includes the respective confidence levels for term(s) and/or phrase(s) predicted to correspond to the spoken utterance. In implementations that utilize an automated assistant implemented by one or more of the computing devices of the user, the plurality of speech hypothesis may persist in memory associated with the automated assistant. In implementations that omit the automated assistant (e.g., the user is dictating directly to a software application without utilizing the automated assistant, or techniques described herein are implemented by a virtual keyboard and/or dictation application), the plurality of speech hypotheses can be stored in the memory as metadata that is associated with the software application and the software application may include an application programming interface (API) that is capable of generating and transmitting the metadata to the memory, and capable of subsequently receiving the metadata that includes the plurality of speech hypotheses.

In some versions of those implementations, the plurality of speech hypotheses may be stored in the memory in response to determining one or more conditions are satisfied. The one or more conditions can include, for example, determining that multiple of the respective confidence levels for multiple of the plurality of speech hypotheses are within a threshold range of one another, determining that none of the respective confidence levels satisfy a threshold confidence level, determining that a plurality of speech hypotheses were generated for a spoken utterance, determining the software application that is associated with the transcription is deactivated (e.g., closed or operating in the background of the computing device), and/or determining that a dialog session between the user of the computing devices and an automated assistant is terminated. For example, if a first term hypothesis of "blouse", for a part of a spoken utterance corresponding to "house", is associated with a first confidence level (e.g., a probability of 0.50), and a second term hypothesis of "house", for the part of the spoken utterance corresponding to "house", is associated with a second confidence level (e.g., a probability of 0.45), and the confidence levels are within a threshold range of confidence levels (e.g., within 0.10), then the term hypotheses for the part of the spoken utterance corresponding to "house" can be stored in the memory. As another example, if the first confidence level (e.g., a probability of 0.50) associated with the first term hypothesis of "blouse" and the second confidence level (e.g., a probability of 0.45) associated with the second term hypothesis of "house" both fail to satisfy a threshold confidence level (e.g., a probability of 0.65), then the term hypotheses for the part of the spoken utterance corresponding to "house" can be stored in the memory. As yet another example, the plurality of speech hypotheses can be stored in the memory in response to determining that the spoken utterance received at the computing device is complete (e.g., determined using an endpointing model). In some further versions of those implementations, each of the plurality of speech hypotheses may be stored in the memory, whereas in other further implementations, only one or more alternate speech hypotheses (e.g., that exclude the given speech hypothesis that was selected) may be stored in the memory.

In some implementations, the given speech hypothesis corresponding to the spoken utterance, or one or more parts thereof, can be graphically demarcated in the transcription. In some versions of those implementations, the given speech hypothesis can be graphically demarcated based on the respective confidence level(s) associated with the given speech hypothesis, such as when one or more of the conditions described above with respect to storing the plurality of speech hypotheses are satisfied. Continuing with the above example, assume that "blouse" is associated with a respective probability of 0.50 and that "house" is associated with a respective probability of 0.45, thereby satisfying one or more of the conditions. In other words, the spoken utterance included the term "house", but it was incorrectly predicted to correspond to "blouse" (e.g., misrecognized). Although the term "house" was misrecognized, the portion of the transcription that includes "blouse" can be graphically demarcated to indicate it is a potential misrecognition and/or to indicate that one or more alternate speech hypotheses exist. For instance, in this transcription, the term "blouse" can be highlighted, underlined, italicized, associated with a graphical element that, when selected, causes the one or more alternate speech hypotheses to be presented, and/or otherwise graphically demarcated.

In some implementations, the plurality of speech hypotheses (or the one or more alternate speech hypotheses), can be loaded at the computing device and/or the additional computing device, and from the memory that is accessible by at least the computing device. The plurality of speech hypotheses (or the one or more alternate speech hypotheses) can be loaded at the computing device and/or the additional computing device based on user interactions detected at the computing device and/or the additional computing device. The user interactions can include, for example, receiving additional user input (e.g., typed or spoken) that is directed to the software application and/or the transcription at the computing device or the additional computing device, accessing of the software application at the computing device or the additional computing device, interacting with the transcription at the computing device or the additional computing device, and/or any other user interaction with the computing device or the additional computing device that is associated with the software application or the transcription.

For example, assume that the original spoken utterance of "Hey assistant, text message Jane I like the new house" was received at a standalone speaker device of the user and that "house" was misrecognized as "blouse" as described above, that the speech hypotheses were stored in the memory that is accessible by at least the computing device, and that the user subsequently accesses a transcription of the text message via text messaging application at a mobile device of the user. In this example, the plurality of speech hypotheses can be loaded at the mobile device (e.g., for the text messaging application), and the transcription of the text message can be graphically demarcated in a similar manner described above to indicate the plurality of speech hypotheses were preserved across the computing devices. As another example, assume the original spoken utterance of "Hey assistant, text message Jane I like the new house" was received at a standalone speaker device of the user and that "house" was misrecognized as "blouse" as described above, that the speech hypotheses were stored in the memory that is accessible by at least the computing device, and that an additional spoken utterance of "Hey assistant, add to the text message to Jane that the backyard is huge" was received at the standalone speaker device of the user. In this example, the plurality of speech hypotheses can be loaded at the standalone speaker device (e.g., for the automated assistant application that interacts with the text messaging application), and the transcription of the text message can be graphically demarcated in a similar manner described above to indicate the plurality of speech hypotheses were preserved across the dialog session.

In various implementations, an automated assistant implemented by the computing device and/or the additional computing device can be utilized in performing the techniques described herein. In implementations that utilize the automated assistant, the automated assistant can interact with various software applications that are installed on the computing devices and/or accessible by the computing devices. Further, the automated assistant can facilitate operations described herein. In additional or alternative implementations, the automated assistant may be omitted. In implementations that omit the automated assistant, the computing devices can receive input from the user (e.g., via a graphical interface element) that allows the user to provide spoken input. Although the automated assistant is not utilized in these implementations, the client device can still facilitate the operations described herein. In some of these implementations, portions of a user interaction can utilize the automated assistant, whereas other portions of the user interaction may omit the automated assistant.

In various implementations, the given speech hypothesis can be modified based on additional user input that is associated with the transcription. In some versions of those implementations, the given speech hypothesis (or part(s) thereof) can be automatically modified with an alternate speech hypothesis based on processing the additional user input. Continuing with the above example, further assume additional user input (e.g., typed or spoken) of "The backyard is huge" is incorporated into the transcription for the text message (e.g., resulting in a transcription of "I love the new blouse. The backyard is huge"). In this example, the given speech hypothesis of "blouse" can be replaced with an alternate speech hypothesis of "house" in the transcription based on the additional user input including "backyard". In some additional or alternative versions of those implementations, the one or more prompt(s) that solicit user input (e.g., spoken, touch, and/or typed) to modify the given speech hypothesis (or part(s) thereof) with the alternate speech hypothesis can be generated and rendered at the computing device or the additional computing device. The prompt(s) may be generated and rendered at the computing device 110 in response to processing the additional user input. Continuing with the above example, the prompt(s) may ask the user whether or not to replace "blouse" with "house". In some versions of these implementations, an indication (e.g., visually and/or audibly) can be rendered to indicate that the given speech hypothesis that was originally predicted to correspond to the part of the spoken utterance was modified with the alternate speech hypothesis. In some versions of those implementations, one or more semantic model(s) or rule(s) can be utilized in determining whether to modify the given speech hypothesis with an alternate speech hypothesis. For example, the semantic model(s) or rule(s) can process the transcription and/or the plurality of speech hypotheses (or the one or more alternate speech hypotheses) and determine that "house" and "backyard" are more semantically meaningful than "blouse" and "backyard". The modification to the given speech hypothesis can be performed based on this semantic determination.

The above description is provided as an overview of only some implementations disclosed herein. Those implementations, and other implementations, are described in additional detail herein. It should be understood that techniques disclosed herein can be implemented locally at a computing device, remotely at server(s) in communication with the computing device via one or more networks, or at both in a distributed manner.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

DETAILED DESCRIPTION

Figure 1:
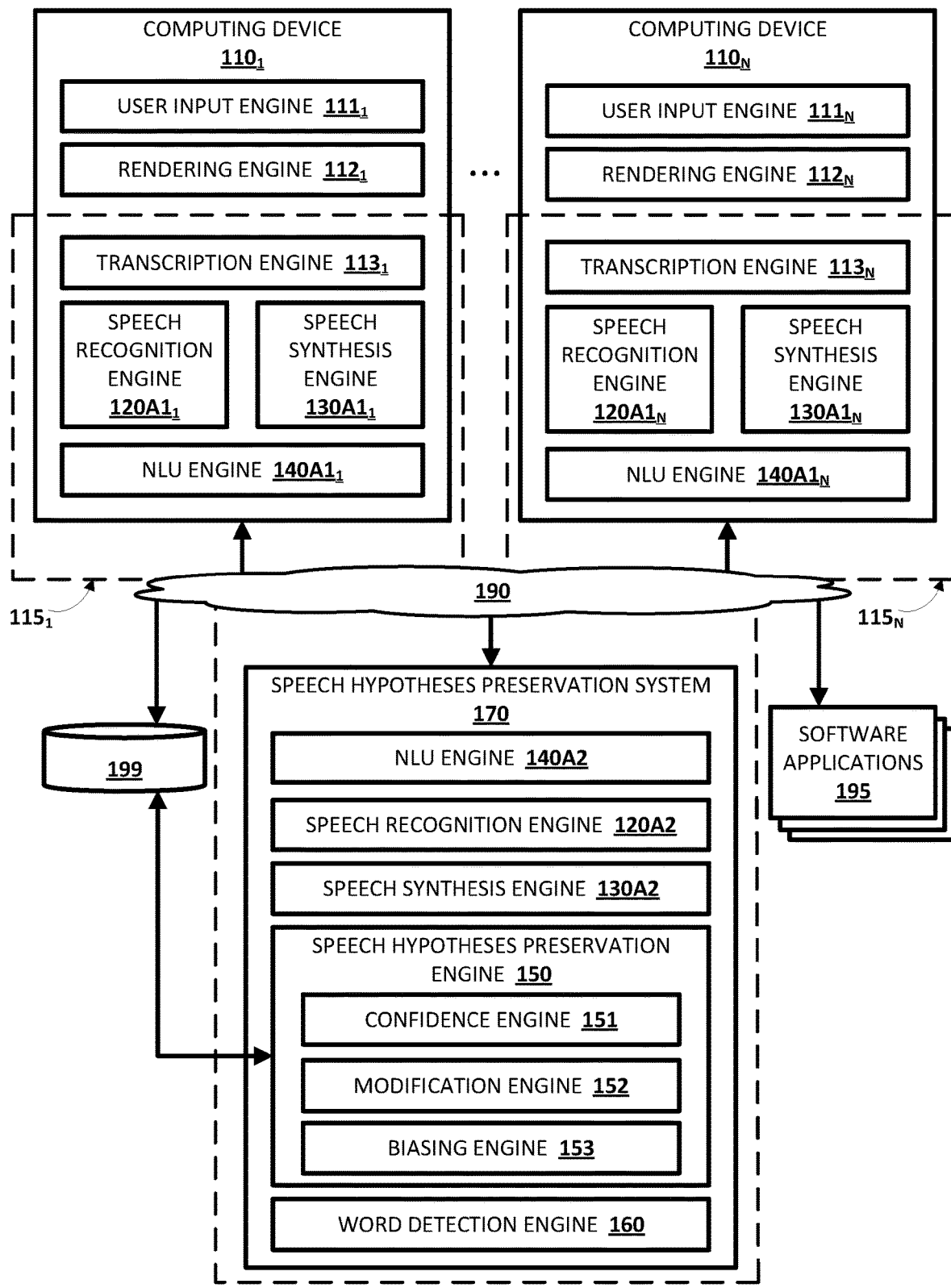
FIG. 1 depicts a block diagram of an example environment that demonstrates various aspects of the present disclosure, and in which implementations disclosed herein may be implemented.

Turning now to FIG. 1, a block diagram of an example environment that demonstrates various aspects of the present disclosure is depicted. The example environment includes a plurality of computing devices $110_{1-N}$ of a user. The computing devices $110_{1-N}$ include, in various implementations, a respective user input engine $111_{1-N}$, a respective rendering engine $112_{1-N}$, a respective speech recognition engine $120A1_{1-N}$, a respective speech synthesis engine $130A1_{1-N}$, a respective natural language understanding (NLU) engine $140A1_{1-N}$, and a respective transcription engine $113_{1-N}$. The computing devices $110_{1-N}$ are also referred to herein simply as computing device 110, unless otherwise indicated. The computing device 110 can be, for example, any combination of a mobile device, a standalone speaker device having a display, a standalone speaker device without any display, a laptop, a desktop computer, a home automation device, and/or any other device(s).

A speech hypotheses preservation system 170 is also illustrated in FIG. 1, and includes, in various implementations, a speech recognition engine 120A2, a speech synthesis engine 130A2, an NLU engine 140A2, a speech hypotheses preservation engine 150, and a word detection engine 160.

In some implementations, the speech hypotheses preservation system 170 can be implemented by server(s) in communication with the computing device 110, and over network(s) 190 as shown in FIG. 1. The network(s) 190 can include, for example, Wi-Fi, Bluetooth, near-field communication, local area network(s), wide area network(s), and/or other networks. In other implementations, the speech hypotheses preservation system 170 can be implemented locally at the computing device 110. Each computing device 110 can implement what appears to be, from a user's perspective, a logical instance of an automated assistant with which the user may engage in a human-to-computer dialog session. Two instances of such an automated assistant $115_{1-N}$ are depicted in FIG. 1 (as indicated by dashed lines), and are generally referred to herein as "the automated assistant 115". The automated assistant 115 can be implemented locally at the computing device 110, remotely at server(s) that implement the speech hypotheses preservation system 170, and/or at both in a distributed manner (e.g., as shown by the dashed line in FIG. 1). In implementations that utilize the automated assistant 115, it can facilitate operations performed by the computing device 110 and/or the speech hypotheses preservation system 170. In implementations that omit the automated assistant 115, the computing device 110 can communicate directly with one another (e.g., peer-to-peer communication between computing device $110_1$ and computing device $110_N$) and/or directly with the speech hypotheses preservation system 170 (e.g., over the network(s) 190).

The respective user input engine $111_{1-N}$ (also referred to herein simply as "the user input engine 111") can detect user input at the computing device 110. The user input detected at the computing device 110 can include spoken utterances detected via respective microphone(s) of the respective computing device 110. The microphone(s) can generate audio data based on spoken utterances detected via the respective microphone(s) of the computing device 110. For example, the user input engine 111 can detect a spoken utterance of a user of the computing device 110. The respective speech recognition engine $120A1_{1-N}$ (also referred to herein simply as "the speech recognition engine 120A1") of the computing device 110 and/or the speech recognition engine 120A2 of the speech hypotheses preservation engine 170 to process, using automatic speech recognition (ASR) model(s) (e.g., stored locally at the computing device 110 and/or remotely at server(s) in communication with the computing device 110), the spoken utterance to generate a plurality of speech hypotheses. Although the techniques described herein generally relate to processing spoken utterances, it should be understood that the user input detected via the user input engine 111 can also include touch and/or typed input.

In some implementations, only the speech recognition engine 120A1 that is local to the computing device 110 may be utilized in processing the spoken utterance to generate the plurality of speech hypotheses. In other implementations, the speech recognition engine 120A2 that is remote to the computing device 110 may be utilized in processing the spoken utterance to generate the plurality of speech hypotheses. In some additional and/or alternative implementations, both the speech recognition engine 120A1 and the speech recognition engine 120A2 may be utilized to generate the plurality of speech hypotheses, such that the plurality of speech hypotheses include speech hypotheses generated by both of the speech recognition engine(s) 120A1 and/or 120A2. The plurality of speech hypotheses can be generated, for example, based on values generated using the ASR model(s) in processing the spoken utterance.

In some implementations, the ASR model(s) are end-to-end speech recognition model(s), such that the speech recognition engine(s) 120A1 and/or 120A2 can generate the plurality of speech hypotheses for the spoken utterance directly based on the values generated using the ASR model(s). For instance, the ASR model(s) can be used to generate the plurality of speech hypotheses on a character-by-character basis (or a token-by-token basis). One non-limiting example of such end-to-end model(s) used to generate the plurality of speech hypotheses on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, mel-frequency Cepstral coefficients (MFCCs), and/or other representation) to generate predicted output, an RNN-T model can be used to continuously process input samples and stream output symbols (e.g., characters of the alphabet). Further, each of the plurality of speech hypotheses generated using the ASR model(s) can be associated with a respective probability (or confidence level) that the corresponding speech hypothesis corresponds to the spoken utterance (or a part thereof), and a given speech hypothesis, from among the plurality of speech hypotheses, can be predicted to correspond to the spoken utterance (or a part thereof) based on the respective probabilities.

In other implementations, when the ASR model(s) are not end-to-end speech recognition model(s), the speech recognition engine(s) 120A1 and/or 120A2 can instead generate predicted phoneme(s) (and/or other representations). For instance, with such models the predicted phoneme(s) (and/or other representations) are then utilized by the speech recognition engine(s) 120A1 and/or 120A2 to determine the plurality of speech hypotheses that conform to the predicted phoneme(s) based on values associated therewith. In doing so, the speech recognition engine(s) 120A1 and/or 120A2 can optionally employ a finite state decoding graph, a lexicon, and/or other resource(s), and utilize values associated therewith. For example, a finite state decoding graph can be generated for the spoken utterance, using the ASR model(s), and map the predicted phoneme(s) to a plurality of terms and/or phrases (various combinations of which form the plurality of speech hypotheses), and each of the terms or phrases in the finite state decoding graph can be associated with a respective probability (or confidence level) that the words or phrases correspond to the spoken utterance (or a part thereof), and a given speech hypothesis (e.g., including a subset of the terms or phrases), from among the plurality of speech hypotheses (e.g., the different combinations of the terms or phrases), can be predicted to correspond to the spoken utterance (or a part thereof) based on the respective probabilities.

The plurality of speech hypotheses can include, for example, a plurality of term hypotheses and/or a plurality of transcription hypotheses. For example, assume the computing device 110 receives a spoken utterance of "tell Jane that I like the new house" that is detected via the user input engine $111_1$, and microphone(s) of the computing device $110_1$ generate audio data that corresponds to the spoken utterance. The speech recognition engine(s) $120A1_1$ and/or 120A2 can process, using the ASR model(s), the audio data that corresponds to the spoken utterance to generate the plurality of speech hypotheses. In this example, the speech recognition engine(s) $120A1_1$ and/or 120A2 can generate term hypotheses corresponding to each term included in the spoken utterance—"tell", "Jane", "that", "I", "like", "the", "new", "house". For example, term hypotheses corresponding to "house" of the spoken utterance can include term hypotheses of "house" (e.g., associated with a first value), "blouse" (e.g., associated with a second value), "mouse" (e.g., associated with a value), and so on. Further assume the automated assistant 180 is highly confident in term hypotheses for "tell", "Jane", "that", "I", "like", "the", and "new" of the spoken utterance, but is not highly confident in a given term hypothesis corresponding to "house" of the spoken utterance. The plurality of transcription hypotheses can be generated based on the plurality of term hypotheses corresponding to "house" of the spoken utterance, resulting in transcription hypotheses of "tell Jane that I like the new house" (e.g., associated with a first value), "tell Jane that I like the new blouse" (e.g., associated with a second value), "tell Jane that I like the new mouse" (e.g., associated with a third value), and so on. The automated assistant $115_1$ (e.g., when the automated assistant $115_1$ is utilized) and/or the computing device $110_1$ (e.g., when the user is dictating without use of the automated assistant $115_1$) can select a given term hypothesis, of the plurality of term hypotheses, corresponding to "blouse" for the spoken utterance based on the respective confidence levels, thereby also selecting a given transcription hypothesis, of the plurality of transcription hypotheses, that includes the given term hypothesis.

In implementations that include the automated assistant 115, it can determine an action to be performed based on a given speech hypothesis (e.g., the given term hypothesis and/or the given transcription hypothesis) selected from among the plurality of speech hypotheses. The action can be determined based on, for example, an intent and slot value(s) for parameter(s) associated with the intent that are included in the spoken utterance. For example, the automated assistant 115 can cause the natural language understanding ("NLU") engine(s) $140A1_{1-N}$ (also referred to herein simply as "the NLU engine 1401A1") and/or 140A2 to process, using NLU model(s) (e.g., stored locally at the computing device 110 and/or remotely at server(s) in communication with the computing device 110), the given speech hypothesis to determine the intent. Continuing with the above example, assume the automated assistant 115 selected "tell Jane that I like the new blouse" as a transcription hypothesis corresponding to the spoken utterance (instead of "house" as intended by the user). In this example, the intent of the action may be "send a message" (e.g., text, email, voice, social media, and/or other types of messages), and the slot value for a "recipient" parameter may be "Jane", and a slot value for a "message content" may be "I like the new blouse". In some versions of those implementations, the automated assistant 115 can cause the rendering engine $112_{1-N}$ (also referred to herein simply as "the rendering engine 112") of the computing device 110 to audibly render a spoken response that is based on the given transcription hypothesis via respective speaker(s) of the computing device 110 and/or visually render a transcription of the spoken utterance via a respective display of the computing device 110 (e.g., generated using the transcription engine $113_{1-N}$ (also referred to herein simply as "the transcription engine 113")). Continuing with the above example, the automated assistant 115 can cause the computing device 110 to audibly render, via respective speaker(s) of the computing device 110, a spoken response of "Ok, sending a message to Jane" that indicates the action to be performed by the automated assistant 115. In some implementations, the speech synthesis engine $130A1_{1-N}$ (also referred to herein simply as "the speech synthesis engine 1301A1") and/or 130A2 can process, using speech synthesis model(s) (e.g., stored locally at the computing device 110 and/or remotely at server(s) in communication with the computing device 110), the given speech hypothesis to generate the spoken response that is audibly rendered via the speaker(s) of the computing device 110. In implementations that omit the automated assistant 115, the transcription corresponding to the spoken utterance may be visually rendered via the respective display of the computing device 110 (e.g., generated using the transcription engine 113).

Figure 2:
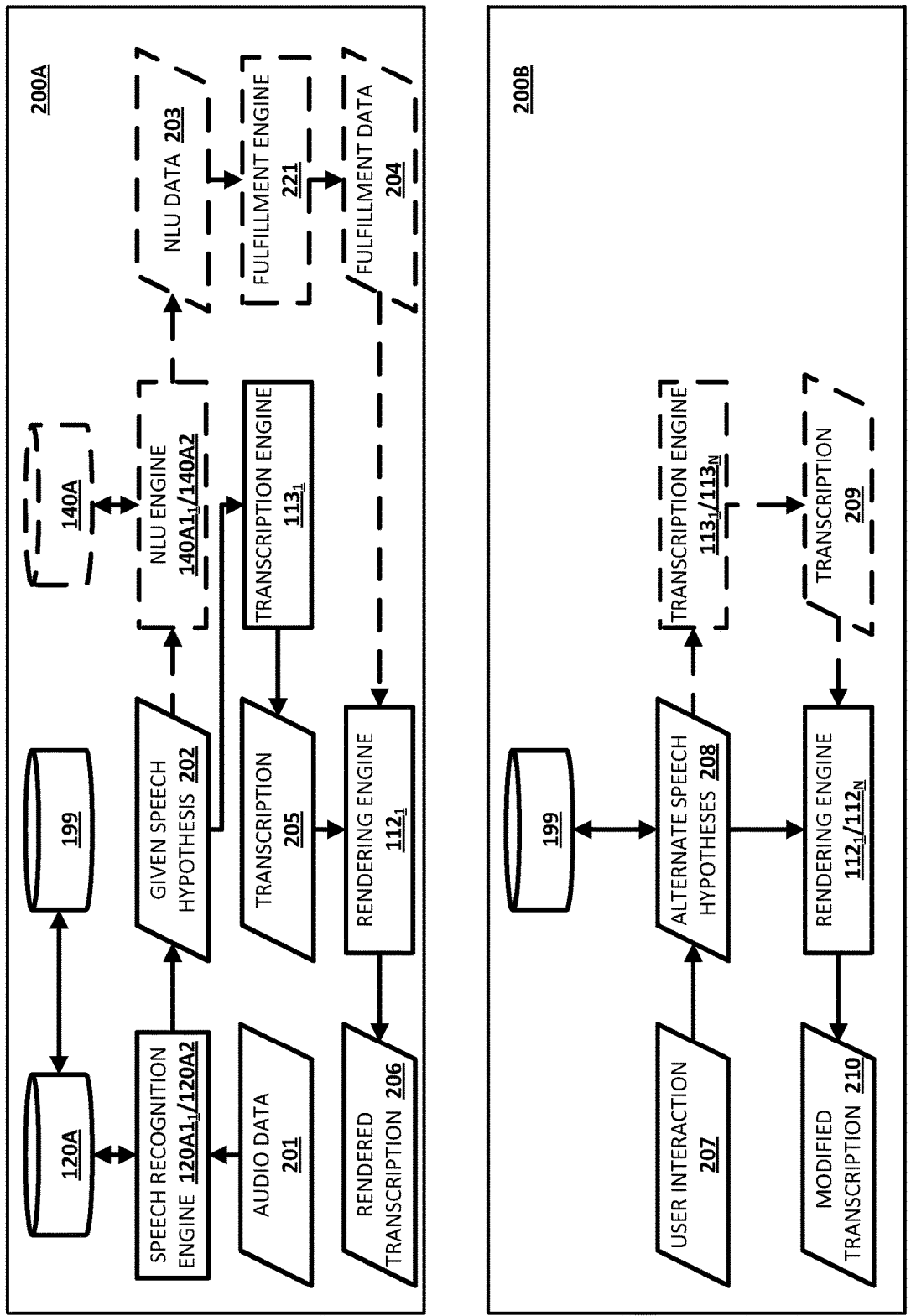
FIG. 2 depicts a process flow illustrating example implementations of utilizing the various components of FIG. 1 in preserving speech hypotheses across computing devices and/or dialog sessions, in accordance with various implementations.

In some implementations, the user input detected via the user input engine 110 can be directed to a software application, from a plurality of software applications 195, that are accessible by the computing device 110 (e.g., over network(s) 190) and/or installed on the computing device 110. The transcriptions generated using the transcription engine 113 can be associated with one or more of the software applications 195. The software applications 195 can include, for example, an automated assistant application associated with the automated assistant 115, a text messaging application, an email application, a notes application, a dictation application, a reminders application, a social media application, a document editing application, a presentation application, a spreadsheet application, a calendar application, a browser application, a documents application and/or any other application capable of transcribing spoken utterances. Further, the software applications 195 may optionally include an application programming interface (API) for storing the plurality of speech hypotheses and/or loading a plurality of stored speech hypotheses (e.g., as described with respect to FIG. 2). In some versions of those implementations, the user may utilize the automated assistant 115 to interface with the software applications 195. For example, assume a spoken utterance of "send Jane a text message that says I like your house" is detected via the user input engine $111_1$ of the computing device $110_1$. In this example, the automated assistant $115_1$ can leverage resources of a text messaging application accessible by the computing device $110_1$ and/or installed on the computing device $110_1$ to generate and send a text message, on behalf of the user, to an additional user ("Jane") using techniques described above with respect to the speech recognition engine $120A_1$ and the NLU engine $140A_1$. In some additional or alternative versions of those implementations, the user can still provide a spoken utterance, but not utilize the automated assistant 115. For example, assume the user of provides touch input at the computing device $110_1$ directed to a graphical element associated with the text messaging application, and that, when selected, enables the user to provide a spoken utterance (e.g., by activating the speech recognition engine $120A_1$) without interacting with the automated assistant $115_1$. In this example, the user may provide the spoken utterance of "I like your house" to generate the text message (e.g., using the speech recognition engine $120A1_1$).

The speech hypotheses preservation engine 150 may include, in various implementations, and as depicted in FIG. 1, a confidence engine 151, a modification engine 152, and/or a biasing engine. Although the speech hypotheses preservation engine 150 is depicted as being implemented remotely at server(s) in communication with the computing device 110, it should be understood that is for the sake of example, and is not meant to be limiting. As noted above, the speech hypotheses preservation system 170, including the speech hypotheses preservation engine 150, can be implemented locally at the computing device $110_1$ and/or the computing device $110_N$.

In various implementations, the computing device 110 and/or the automated assistant 115 can cause the plurality of speech hypotheses to be stored in memory 199 that is accessible by the computing device 110. The memory 199 can be, for example, on-device memory of the computing device $110_1$, (e.g., RAM or ROM) on-device memory of the computing device $110_N$, memory that is remote to the computing device 110 (e.g., memory of server(s)), and/or memory that is associated with the software applications 195. In some implementations, the plurality of speech hypotheses stored in the memory 199 can include the plurality of term hypotheses and/or transcription hypotheses that are generated based on the spoken utterance (and optionally the value(s) and/or the finite state decoding graph associated therewith). In some additional or alternative implementations, the plurality of speech hypotheses stored in the memory 199 can include raw output and/or intermediate output from the ASR model(s). For example, the plurality of speech hypotheses stored in the memory can include a sequence of probability distributions (or a subset thereof) generated in processing the spoken utterance or some other intermediate output generated using the ASR model(s).

In some implementations, the plurality of speech hypotheses may be stored in the memory 199 in response to determining one or more conditions are satisfied. In some versions of those implementations, the confidence engine 151 can determine whether to store the plurality of speech hypotheses based on the values generated by the ASR model(s) in processing a spoken utterance (or parts thereof) detected at the computing device 110. For example, assume the values generated by the ASR model(s) include respective confidence levels associated with each of the plurality of speech hypotheses (or parts thereof). In some examples, the plurality of speech hypotheses may be stored in the memory 199 in response to determining that multiple of the respective confidence levels are within a threshold range of one another. For instance, if a first term hypothesis of "house" for a part of a spoken utterance corresponding to "house" is associated with a first confidence level (e.g., a probability of 0.50), and a second term hypothesis of "blouse" for the part of the spoken utterance corresponding to "house" is associated with a second confidence level (e.g., a probability of 0.45) are within a threshold range of confidence levels (e.g., within a probability of 0.10), then the speech hypotheses for the part of the spoken utterance corresponding to "house" can be stored in the memory 199. In some additional or alternative examples, the plurality of speech hypotheses may be stored in the memory 199 in response to determining that none of the respective confidence levels satisfy a threshold confidence level. For instance, if a first term hypothesis of "house" for a part of a spoken utterance corresponding to "house" is associated with a first confidence level (e.g., a probability of 0.50), and a second term hypothesis of "blouse" for the part of the spoken utterance corresponding to "house" is associated with a second confidence level (e.g., a probability of 0.45) fail to satisfy a threshold confidence level (e.g., associated with a probability of 0.65), then the speech hypotheses for the part of the spoken utterance corresponding to "house" can be stored in the memory 199.

In some additional or alternative versions of those implementations, the confidence engine 151 can determine whether to store the plurality of speech hypotheses based on capabilities of the computing device 110 that received the spoken utterance. For example, if the computing device 110 that receives the spoken utterance is a standalone speaker device without a display (e.g., not capable of visually rendering the transcription of the spoken utterance), then the plurality of speech hypotheses can be stored in the memory 199 regardless of any determination by the confidence engine 151. As another example, if the computing device 110 that receives the spoken utterance is a standalone speaker device having a display, but the user that provided the spoken utterance is not proximate to the computing device 110 to view the transcription (e.g., determined based on proximity sensors of the computing device 110), then the plurality of speech hypotheses can be stored in the memory 199 regardless of any determination by the confidence engine 151.

By storing the plurality of speech hypotheses in the memory 199 accessible by the computing device 110, the plurality of speech hypotheses for the spoken utterance (or parts thereof) can be preserved across computing devices and/or dialog sessions (that optionally leverage functionality of the automated assistant 115). For example, and referring to FIG. 2, a process flow of preserving speech hypotheses across computing devices and/or dialog sessions is depicted. In some implementations, block 200A of FIG. 2 may represent a user interaction with the computing device $110_1$ and block 200B of FIG. 2 may represent a user interaction with the computing device $110_N$, where a plurality of speech hypotheses are preserved across the user interactions with the computing devices $110_{1-N}$. In some additional or alternative implementations, block 200A of FIG. 2 may represent a dialog session with the computing device $110_1$ (optionally including the automated assistant 115) and block 200B of FIG. 2 may represent a subsequent dialog session with the computing device $110_N$ (optionally including the automated assistant 115), where a plurality of speech hypotheses are preserved across the dialog sessions.

With respect to block 200A, assume audio data 201 corresponding to a spoken utterance of "tell Jane that I like the new house" is received at the computing device $110_1$. The speech recognition engine(s) $120A1_1$ and/or 120A2 can process, using ASR model(s) 120A, the audio data 201 to generate a plurality of speech hypotheses. Further assume a given speech hypothesis of "blouse", for a part of the spoken utterance corresponding to "house", is selected from among the plurality of speech hypotheses based on respective confidence levels associated with each of the plurality of speech hypotheses for the part of the spoken utterance corresponding to "house". The plurality of speech hypotheses for the part of the spoken utterance corresponding to "house" can be stored in the memory 199 (and optionally in response to the confidence engine 151 determining one or more of the conditions are satisfied).

In implementations that utilize the automated assistant 115, the automated assistant 115 can cause the NLU engine $140A1_1$ and/or 140A2 to process, using NLU model(s) 140A, the given speech hypothesis to generate NLU data 203. The NLU data 203 can include, for example, an intent (e.g., send a message) and slot value(s) for parameter(s) associated with the intent (e.g., a slot value of "Jane" for a "recipient" parameter, and a slot value of "I like the new blouse" for a "message content" parameter). Further, the automated assistant 115 can cause fulfillment engine 221 to process, using fulfillment model(s) or rule(s) (not depicted), the NLU data 203 to generate fulfillment data 204. The fulfillment data 204 can include, for example, a request to establish communication with a software application (e.g., one or more of the software applications 195) via an API of the software application, a request that is to be transmitted to server(s) or other computing device(s), and/or other fulfillment data. The automated assistant can then cause the fulfillment data 204 to be transmitted to the rendering engine $112_1$. Moreover, the automated assistant 115 can cause the transcription engine $113_1$ to process the given speech hypothesis 202 to generate a transcription 205 (e.g., "I like the new blouse") corresponding thereto, and can cause the transcription 205 to also be transmitted to the rendering engine $112_1$. The rendering engine $112_1$ can process the fulfillment data 24 and the transcription 205 to cause a rendered transcription 206 to be rendered at the software application (e.g., a text messaging application, an email application, a social media application, and/or any other software application for communicating messages).

In implementations that omit utilization the automated assistant 115, the NLU engine $140A1_1$ and/or 140A2, and the fulfillment engine 221 may be omitted. In these implementations, the user of the computing device $110_1$ may simply direct input to a graphical element that, when selected, enables the user of the computing device $110_1$ to provide spoken utterances without leveraging the automated assistant 115 (e.g., as described with respect to FIGS. 7A and 7B). The graphical element may be displayed along with an interface that is associated with the software application. As a result, the audio data 201 may correspond to a spoken utterance of "I like the new house" (e.g., omitting "tell Jane that . . . ") since the automated assistant 115 is not invoked, thereby obviating the need for the NLU engine $140A1_1$ and/or 140A2, and the fulfillment engine 221. The plurality of speech hypotheses may be stored in the memory 199 in the same manner described above (and optionally in response to the confidence engine 151 determining one or more of the conditions are satisfied). Thus, the given speech hypothesis 202 of "blouse", for a part of the spoken utterance corresponding to "house", may be selected from among the plurality of speech hypotheses as described above, and transmitted to the transcription engine $113_1$ to generate the transcription 205 (e.g., "I like the new blouse"). The computing device $110_1$ can cause the transcription 205 to be transmitted to the rendering engine $112_1$, and the rendering engine $112_1$ can process the transcription 205 to cause rendered transcription 206 to be rendered at the software application.

In various applications, the rendering engine $112_1$ can further cause the rendered transcription 206 can be graphically demarcated based on the value(s) associated with the given speech hypothesis 202 (e.g., as described with respect to FIGS. 5A-5C) when one or more of the conditions are satisfied (e.g., as determined by the confidence engine 151). For example, assume the values associated with the plurality of speech hypotheses are respective probabilities that are indicative of a confidence level each of the plurality of speech hypotheses correspond to the spoken utterance (or a part thereof). In this example, assume that "blouse" is associated with a respective probability of 0.5 and that "house" is associated with a respective probability of 0.4, thereby satisfying one or more of the conditions described above with respect to the confidence engine 151. The given speech hypothesis 202 corresponding the "house" part of the spoken utterance in this example may correspond to "blouse" (e.g., selected based on the values), but the rendering engine $112_1$ may cause a portion of the transcription corresponding to "blouse" to be graphically demarcated (e.g., highlighted, underlined, italicized, associated with a graphical element that, when selected, causes alternate speech hypotheses for the given speech hypothesis 202 to be presented, and/or otherwise graphically demarcated) to indicate the computing device $110_1$ is not confident in the portion of the transcription.

Further assume that the user refrains from further interacting with the computing device $110_1$ at block 200A and/or the dialog session is terminated at block 200A, and without sending the message "I like the new blouse" to "Jane". For example, the user may deactivate the software application (e.g., close the software application or leave the software application operating in the background of the computing device $110_1$), affirmatively terminate the dialog session, inferentially terminate the dialog session by providing no further spoken utterances or touch input directed to the computing device $110_1$, and/or the computing device $110_1$ and/or the automated assistant 115 may determine the spoken utterance is complete. With respect to block 200B, further assume that a user interaction 207 is detected at one of the computing devices $110_{1-N}$ (e.g., via the user input engine 111). The user interaction 207 can include, for example, the user subsequently activating the software application (e.g., relaunching the software application or the software application operating in the foreground of the computing device $110_1$), the user interacting with the previously rendered transcription 206, the user initiating a subsequent dialog session with the automated assistant 115 related to the previously rendered transcription 206 and/or in continuance of the previous dialog session.

In response to detecting the user interaction 207 at one of the computing device $110_{1-N}$, one or more alternate speech hypotheses 208 can be loaded at the software application and/or an automated assistant interface that is associated with the automated assistant 115 and from the memory 199 that is accessible by the computing devices 110. The one or more alternate speech hypotheses can include a subset of the plurality of speech hypotheses initially stored in the memory 199, where the subset of the plurality of speech hypotheses excludes the given speech hypothesis 202. The subset of the plurality of speech hypotheses initially stored in the memory 199 may also be limited to those that are associated with value(s) that are within a threshold range of the given speech hypotheses that was selected as corresponding to the part(s) of the spoken utterance. Further, the rendering engine $112_1$ and/or $112_N$ can process the alternate speech hypotheses to modify the rendered transcription 206, resulting in a modified transcription 210. In other words, the rendered transcription 206 may persist in memory of the software application, but the alternate speech hypotheses may be discarded when the software application is deactivated or the dialog session is terminated, and the rendering engine $112_1$ and/or $112_N$ can cause the alternate speech hypotheses to appear, from the perspective of the user of the computing device 110, that the alternate speech hypotheses also persisted in the memory of the software application (e.g., graphically demarcated). In some implementations, and prior to rendering the modified transcription 210, the alternate speech hypotheses 208 may be processed by the transcription engine $113_1$ and/or $113_N$ to generate a transcription 209 when the transcription does not persist in memory of the software application and/or the automated assistant when utilized. In these implementations, rendering engine $112_1$ and/or $112_N$ can process the alternate speech hypotheses 208 and the transcription 209 to generate the modified transcription 210.

Referring back to FIG. 1, and subsequent to loading the plurality of speech hypotheses (or the one or more alternate speech hypotheses) from the memory 199 accessible by the computing device 110, the modification engine 152 can determine whether to modify a transcription of a spoken utterance (or portion thereof) based on additional user input received at the computing device 110. The additional user input can be, for example, an additional spoken utterance, typed input (e.g., via a keyboard of the computing device 110), and/or touch input (e.g., via a display of the computing device 110). For example, assume a transcription of "I like the new blouse" was previously generated based on a spoken utterance of "I like the new house", where the part of the spoken utterance "house" was misrecognized as "blouse", and assume the plurality of speech hypotheses for the part of the spoken utterance "house" were stored in the memory 199. Further assume an additional spoken utterance of "add to my message to Jane that the backyard is huge" (or an additional spoken utterance "the backyard is huge" when the automated assistant 115 is not utilized and/or typed input of "the backyard is huge") is correctly recognized and incorporated into the transcription based on a given additional speech hypothesis being selected, from among a plurality of additional speech hypotheses, based on additional values associated with processing the additional spoken utterance, and resulting in the transcription "I like the new blouse, the backyard is huge" (e.g., where "blouse" is a misrecognition).

In this example, the modification engine 152 can determine whether to modify the original given speech hypothesis of "blouse" that was selected based on the additional given speech hypothesis of "the backyard is huge" (or term hypotheses thereof) and/or based on the values associated with the original given speech hypothesis. For instance, the modification engine 152 may determine that original given speech hypothesis of "blouse" was a misrecognition, and that an alternate speech hypothesis of "house" is the correct speech hypothesis for the original part of the spoken utterance based on the additional given speech hypothesis including the term "backyard" and/or based on the value(s) associated with "house" in processing the original spoken utterance. In other words, the modification engine 152 can automatically modify the portion of the transcription that includes "blouse" by replacing "blouse" with "house".

In some implementations, the modification engine 152 can automatically replace a given speech hypothesis (or part(s) thereof) with an alternate speech hypothesis in response to selecting the additional given speech hypothesis for the additional spoken utterance or in response to receiving additional typed input. The modification engine 152 can automatically replace the given speech hypothesis (or the part(s) thereof) with the alternate speech hypothesis in response to determining the value(s) associated with the alternate speech hypothesis (and optionally in combination with the value(s) associated with the additional given speech hypothesis) satisfy a threshold. Continuing with the above example, the modification engine 152 can automatically replace "blouse" with "house" in the transcription in response to selecting the additional speech hypothesis that includes "backyard". In some versions of those implementations, the modification engine 152 can cause the rendering engine 112 to render an indication (e.g., visually and/or audibly) that the given speech hypothesis that was originally predicted to correspond to the part of the spoken utterance was modified. In some additional or alternative implementations, the modification engine 152 can generate prompt(s) that solicit user input (e.g., spoken, touch, and/or typed) to modify the given speech hypothesis (or part(s) thereof) with an alternate speech hypothesis. The modification engine 152 can generate the prompt(s), in lieu of automatically replacing the given speech hypothesis (or the part(s) thereof) with the alternate speech hypothesis, in response to determining the value(s) associated with the alternate speech hypothesis (and optionally in combination with the value(s) associated with the additional given speech hypothesis) fail to satisfy a threshold. The prompt(s) may be generated and rendered at the computing device 110 in response to selecting the additional given speech hypothesis for the additional spoken utterance or in response to receiving additional typed input. Continuing with the above example, the modification engine 152 can generate and render prompt(s) that ask the user whether or not to replace "blouse" with "house". The modification engine 152 can optionally utilize one or more semantic model(s) or rule(s) in determining whether to modify the given speech hypothesis with an alternate speech hypothesis. For example, the semantic model(s) or rule(s) can process the transcription and/or the plurality of speech hypotheses (or the one or more alternate speech hypotheses) and determine that "house" and "backyard" are more semantically meaningful than "blouse" and "backyard". The modification engine 152 can determine to modify the given speech hypothesis based on this semantic determination.

In implementations where the ASR model(s) are end-to-end models and output generated using the ASR model(s) includes the plurality of speech hypotheses and the respective confidence levels associated with each of the plurality of speech hypotheses, the modification engine 152 can utilize the respective probabilities of one or more alternate speech hypotheses to modify the given speech hypothesis (e.g., a subset of the plurality of speech hypotheses that exclude the given speech hypothesis that was originally predicted to correspond to the spoken utterance (or part(s) thereof)). Continuing with the above example, assume that a given speech hypothesis of "blouse" is associated with a first respective confidence level of 0.50 and was selected to correspond to a part of a spoken utterance corresponding to "house", and that an alternate speech hypothesis of "house" is associated with a second respective confidence level of 0.45 was not selected to correspond to the part of the spoken utterance, but was stored in the memory 199 (and optionally along with the second confidence level). In this example, the modification engine 152 can replace "blouse" with "house" after the plurality of speech hypotheses (or the one or more alternate speech hypotheses) are loaded from the memory 199, and based on the second respective confidence level associated with "house".

In implementations where the ASR model(s) are not end-to-end models and output generated using the ASR model(s) include a finite state decoding graph that includes respective confidence levels associated with term(s) and/or phrase(s) that are predicted to correspond to the original spoken utterance, the modification engine 152 can re-decode the finite state decoding graph to modify the given speech hypothesis. Continuing with the above example, assume that a given speech hypothesis of "blouse" is associated with a first respective confidence level of 0.50 in the finite state decoding graph and was selected to correspond to a part of a spoken utterance corresponding to "house", and that an alternate speech hypothesis of "house" in the finite state decoding graph is associated with a second respective confidence level of 0.45 was not selected to correspond to the part of the spoken utterance, but was stored in the memory 199 (and optionally along with the second confidence level) as part of the finite state decoding graph. In this example, the modification engine 152 can replace "blouse" with "house" after the plurality of speech hypotheses (or the one or more alternate speech hypotheses) are loaded from the memory 199, and based on re-decoding the finite state decoding graph in response to receiving the additional user input. The modification engine 151 may optionally utilize a finite state decoding graph that includes term(s) and/or phrase(s) based on the original spoken input and the additional user input.

In various implementations, biasing engine 153 can cause subsequent speech recognition of subsequent spoken utterances to be biased on any modifications of speech hypotheses. The biasing engine 153 can identify term(s) that were misrecognized and/or term(s) that replace or supplant the misrecognized term(s), and can store these term(s) in the memory 199. Continuing with the above example, the biasing engine 143 can cause the term(s) "house" and "blouse" to be stored as biased term(s). Further assume that the computing device 110 receives a subsequent spoken utterance of "the new house is beautiful". In this example, the biasing engine 153 can cause the automated assistant to bias speech recognition of the subsequent spoken utterance towards the term hypothesis of "house" and/or away from the term hypothesis of "blouse". In some implementations, the biasing engine 153 can bias speech recognition of the subsequent spoken utterance towards and/or away from the biased term(s) for only the current human-to-computer dialog session. In some additional and/or alternative implementations, the biasing engine 153 can bias speech recognition of the subsequent spoken utterance towards and/or away from the biased term(s) for subsequent human-to-computer dialog sessions. For instance, the biasing may be limited to a particular user interaction and/or a particular duration of time. By limiting the biasing, the speech hypotheses preservation system 170 can combat over biasing towards and/or away from the biased term(s).

In various implementations, the word detection engine 160 can process, using various word detection model(s), audio data to determine whether a corresponding spoken utterance and/or the additional spoken utterance includes a particular term or phrase, whether the spoken utterance is complete, and/or other word processing model(s). The word detection model(s) can include, for example, a hotword detection model trained to detect a particular term or phrase that invokes the automated assistant 115 (e.g., "Assistant", "Hey Assistant", "Okay Assistant", or the like) and activates one or more component(s) of the computing device 110 and/or the speech misrecognition system 160 (e.g., speech recognition engine 120A1 and/or 120A2). The word detection model(s) can additionally or alternatively include, for example, an endpointing model trained to detect when a spoken utterance is complete (e.g., based on terms included in the spoken utterance and/or acoustic features of audio data).

Accordingly, the plurality of speech hypotheses generated for the original spoken utterance can be preserved across computing devices $110_{1-N}$ and/or dialog sessions. By preserving the plurality of speech hypotheses across the computing devices $110_{1-N}$ and/or across the dialog sessions, potentially misrecognized portions of the original spoken utterance can be flagged for the user of the computing devices $110_{1-N}$ and/or automatically corrected for the user of the computing devices $110_{1-N}$. In this manner, misrecognitions can be identified and corrected in a manner that reduces a length of the human-to-computer dialog between the user and one or more of the computing devices $110_{1-N}$ (or an automated assistant implemented thereon), thereby conserving computational and/or network resources. Further, a quantity of user inputs received at one or more of the computing devices $110_{1-N}$ can be reduced in that one or more of the computing devices $110_{1-N}$ (or the automated assistant $115_{1-N}$ implemented thereon) can automatically correct these potential misrecognitions or notify the user of these potential recognitions, and the user need not manually correct any potential misrecognitions. Moreover, in implementations where the transcription is a portion of a message (e.g., an email message, a text message, and/or other types of messages) that is transmitted over the network(s) 190 to other users, computational and/or network resources can be conserved in that an additional message to correct misrecognitions in the original message need not be generated by one or more of the computing devices $110_{1-N}$ or transmitted to the other users.

Figure 3A:
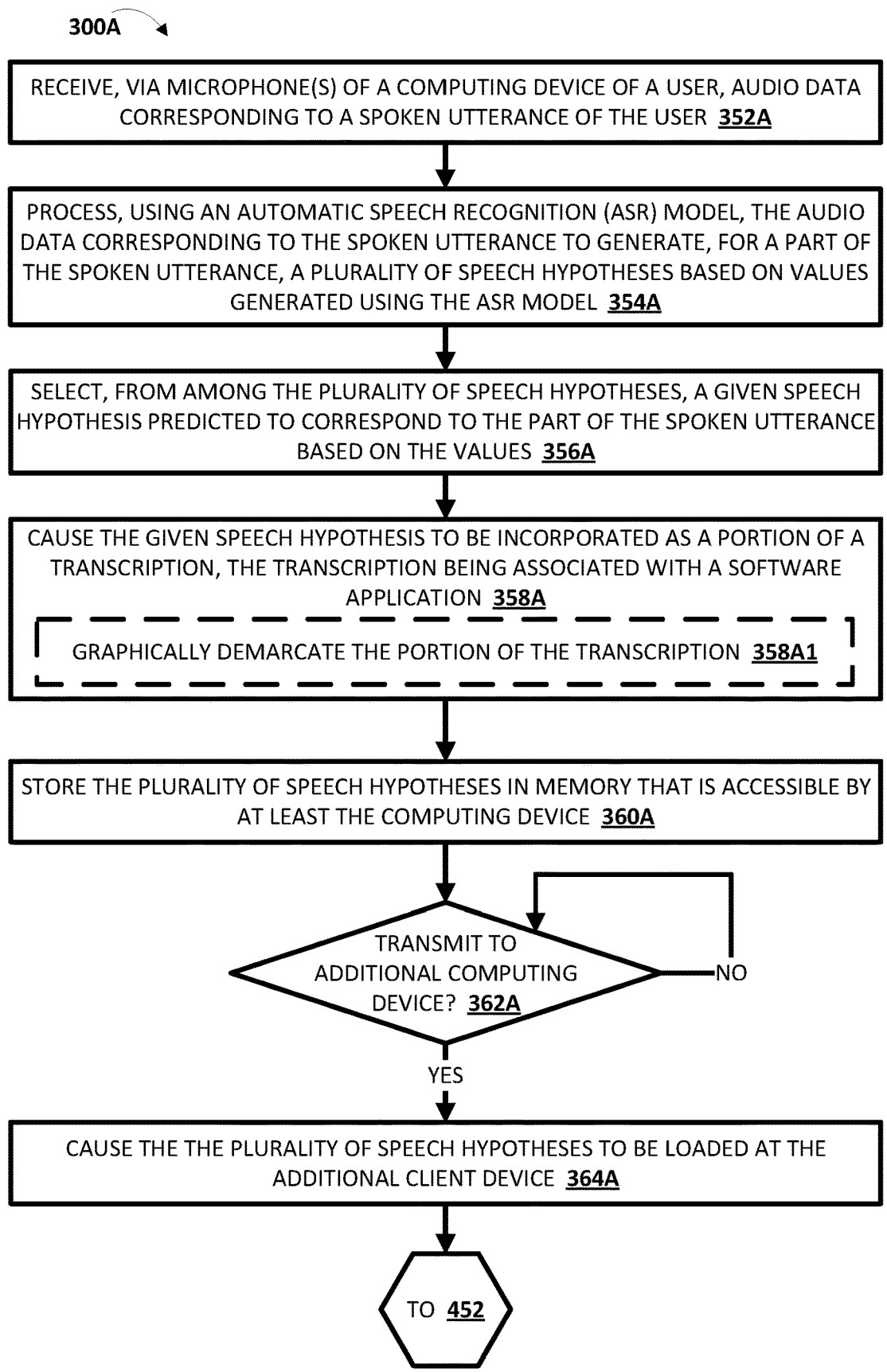
FIG. 3A is a flowchart illustrating an example method of preserving speech hypotheses across computing devices, in accordance with various implementations.
Figure 3B:
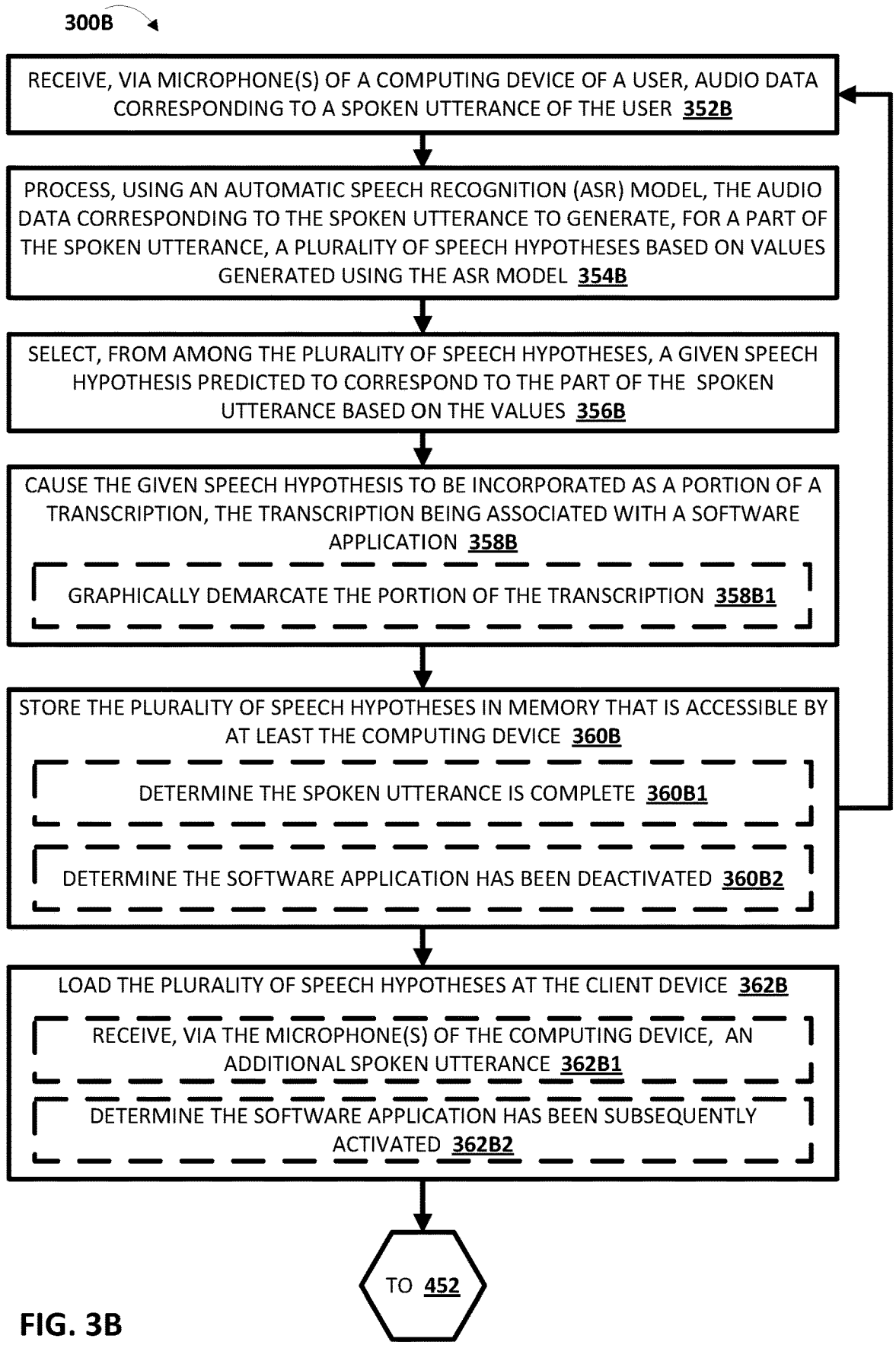
FIG. 3B is a flowchart illustrating an example method of preserving speech hypotheses across dialog sessions, in accordance with various implementations.
Figure 4:
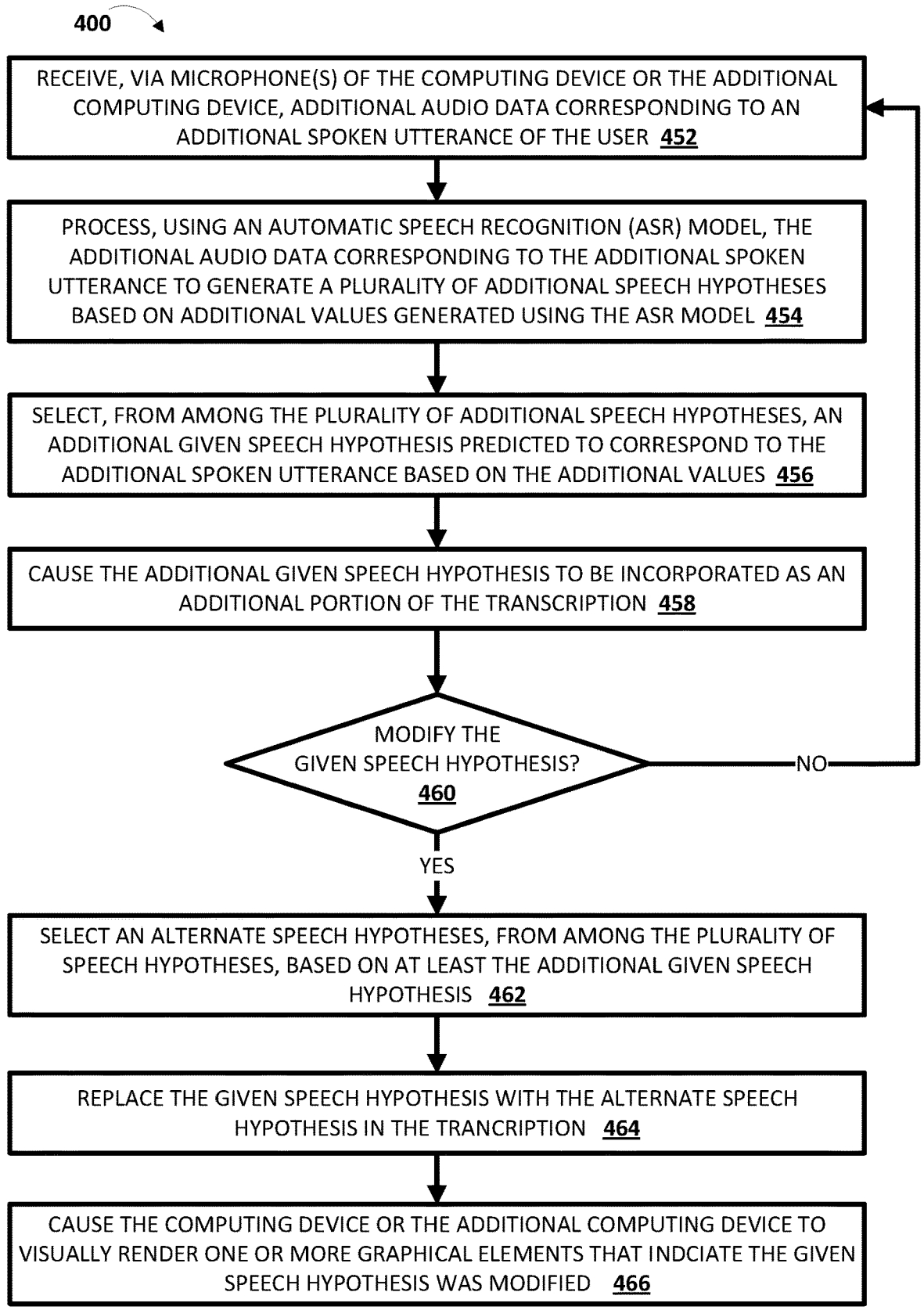
FIG. 4 is a flowchart illustrating an example method of correcting speech misrecognition(s) based on speech hypotheses that are preserved across computing devices and/or dialog sessions of FIGS. 3A and 3B, in accordance with various implementations.

Turning now to FIGS. 3A, 3B, and 4, flowcharts illustrating example methods 300A, 300B, 400 of preserving speech hypotheses across computing devices and/or dialog sessions, and correcting misrecognitions based thereon are depicted. For convenience, the operations of the methods 300A, 300B, 400 are described with reference to a system that performs the operations. The system of the methods 300A, 300B, 400 include one or more processors and/or other component(s) of a computing device. For example, the system of the methods 300A, 300B, 400 can be computing device 110 of FIGS. 1, 5A-5C, 6A-6B, and 7A-7B, computing device 810 of FIG. 8, one or more servers, other computing devices, and/or any combination thereof. Moreover, while operations of the methods 300A, 300B, 400 are shown in a particular order, this is not meant to be limiting. One or more operations may be reordered, omitted, and/or added.

Referring initially to FIG. 3A, and with respect to preserving the plurality of speech hypotheses across computing devices, at block 352A, the system receives, via microphone(s) of a computing device of a user, audio data corresponding to a spoken utterance of the user (e.g., "tell Jane that I like the new house"). At block 354A, the system processes, using an automatic speech recognition (ASR) model, the audio data corresponding to the spoken utterance to generate, for a part of the spoken utterance, a plurality of speech hypotheses based on values generated using the ASR model. The plurality of speech hypotheses can include, for example, term hypotheses for each term included in the spoken utterance (e.g., "house", "blouse", "mouse", and so on for the part of the spoken utterance that includes "house") and/or transcription hypotheses that include various combinations of the term hypotheses (e.g., "I like the new house", "I like the new blouse", and so on). Each of the plurality of speech hypotheses may be associated with a respective confidence level. For example, each term hypothesis may be associated with a respective confidence level, and each transcription hypothesis may be associated with a distinct, respective confidence level.

At block 356A, the system selects, from among the plurality of speech hypotheses, a given speech hypothesis predicted to correspond to the part of the spoken utterance based on the values. In some implementations, the values generated using the ASR model may include the respective confidence levels. In some additional or alternative implementations, the values generated using the ASR model may be based on a finite state decoding graph generated that includes terms and/or phrases that are predicted to correspond to the spoken utterance (or parts thereof) and the respective confidence levels for the term(s) and/or phrase(s). The given speech hypothesis can be selected based on the respective confidence levels (e.g., select a term hypothesis of "blouse" instead of "house" as intended by the user).

At block 358A, the system causes the given speech hypothesis to be incorporated as a portion of a transcription, the transcription being associated with a software application. The transcription associated with the software application can be, for example, text for automated assistant application, a text message for a text messaging application, an email for an email application, a note for notes application, text for a dictation application, a reminder for a reminders application, a social media post or message for a social media application, a document for a document editing application, a presentation for a presentation application, a spreadsheet for a spreadsheet application, a calendar entry for a calendar application, a query for a browser application, and/or any other application capable of transcribing spoken utterances. The transcription can be visually rendered at the computing device (if it includes a display) at a user interface associated with an automated assistant (if utilized) and/or a user interface associated with the software application. Further, the transcription may optionally include additional portions that precede the portion incorporated into the transcription.

In some implementations, block 358A may include sub-block 358A. If included, at sub-block 358A, the system graphically demarcates the portion of the transcription. The transcription may be graphically demarcated based on the value(s) associated with the given speech hypothesis when one or more of conditions are satisfied (e.g., described above with respect to the confidence engine 151 of FIG. 1). For example, assume the values associated with the plurality of speech hypotheses for a spoken utterance of "I like the new house" are respective probabilities that are indicative of a confidence level each of the plurality of speech hypotheses correspond to the spoken utterance (or a part thereof). In this example, assume that "blouse" is associated with a respective probability of 0.5 and that "house" is associated with a respective probability of 0.4. The given speech hypothesis corresponding the "house" part of the spoken utterance in this example may correspond to "blouse" (e.g., selected based on the values), but the system may cause a portion of the transcription corresponding to "blouse" to be graphically demarcated (e.g., highlighted, underlined, italicized, associated with a graphical element that, when selected, causes alternate speech hypotheses for the given speech hypothesis 202 to be presented, and/or otherwise graphically demarcated) to indicate the computing device is not confident in the portion of the transcription (e.g., described above with respect to the confidence engine 151 of FIG. 1).

At block 360A, the system stores the plurality of speech hypotheses in memory that is accessible by at least the computing device. The memory can be, for example, on-device memory that is local to the computing device and/or remote memory at server(s) in communication with the computing device. In implementations where the speech hypotheses are transmitted over network(s), the speech hypotheses can be encrypted to preserve privacy of the user. In some implementations, the system may only store the plurality of speech hypotheses in the memory that is accessible by the computing device in response to determining one or more conditions are satisfied (e.g., described above with respect to the confidence engine 151).

At block 362A, the system determines whether to transmit the plurality of speech hypotheses to an additional computing device of the user. The system can transmit the plurality of speech hypotheses to the additional computing device in response to determining one or more conditions are satisfied. The one or more conditions for transmitting the plurality of speech hypotheses to the additional computing device can include, for example, determining the software application was accessed at the additional computing device, determining the user interacted with the transcription, determining the plurality of speech hypotheses for the transcription associated with the software application exist, and/or other conditions for transmitting the plurality of speech hypotheses. The system can transmit the plurality of speech hypotheses (and optionally respective confidence levels and/or a corresponding finite state decoding graph for the spoken utterance) from the memory to the additional computing device (e.g., from the computing device to the additional computing device in a peer-to-peer fashion or from a remote system to the additional computing device). If, at an iteration of block 362A, the system determines one or more of the conditions are not satisfied at block 362A, the system continues to monitor for satisfaction of one or more of the conditions at block 362A. If, at an iteration of block 362A, the system determines one or more of the conditions are satisfied, the system transmits the plurality of speech hypotheses to the additional computing device and proceeds to block 364A.

At block 364A, the system causes the plurality of speech hypotheses to be loaded at the additional computing device. In implementations where the software application is associated with an automated assistant, the plurality of speech hypotheses can be loaded at an automated assistant application. In implementations where the software application is not associated with the automated assistant, the software application may include an API capable of receiving the plurality of speech hypotheses. The system may proceed to block 462 of FIG. 4. Block 462 of FIG. 4 is described in more detail below.

Referring now to FIG. 3B, and with respect to preserving the plurality of speech hypotheses across dialog sessions, the system can perform the operations of blocks 352B, 354B, 356B, and 358B (optionally including sub-block 358B1) in the same or similar manner described with respect to the system performing the operations of blocks 352A, 354A, 356A, and 358A (optionally including sub-block 358A1), respectively, described above with respect to FIG. 3A.

However, at block 360B, when the system stores the plurality of speech hypotheses in memory that is accessible by at least the computing device, the storing may be based on the operations of sub-block 360B1 and/or the operations of sub-block 360B2. In some implementations, and at block 360B1, the system can store the plurality of speech hypotheses in response to determining that the spoken utterance is complete. The system can determine the spoken utterance is complete using an endpointing model (e.g., described above with respect to the word detection engine 160 of FIG. 1). In some additional or alternative implementations, and at block 360B2, the system can store the plurality of speech hypotheses in response to determining that the software application has been deactivated. The system can determine the software application is deactivated if the software application is closed by the user of the computing device or the software application is merely operating in the background of the computing device.

Further, at block 362B, the system loads the plurality of speech hypotheses at the computing device based on the operations of sub-block 362B1 and/or the operations of sub-block 362B2. In some implementations, and at block 362B1, the system can load the plurality of speech hypotheses at the computing device in response to receiving, via the microphone(s) of the computing device, an additional spoken utterance. In some versions of those implementations, the plurality of speech hypotheses may only be loaded if the additional spoken utterance is related to the software application and/or the transcription. In some additional or alternative implementations, and at block 362B2 the system can load the plurality of speech hypotheses at the computing device in response to determining that the software application has been subsequently activated. The system can determine the software application is subsequently activated if the software application is relaunched by the user of the computing device or the software application is operating in the foreground ground of the computing device. The system may proceed to block 462 of FIG. 4. Block 462 of FIG. 4 is described in more detail below.

Referring now to FIG. 4, and with respect to automatically correcting speech misrecognition(s), at block 452, the system receives, via microphone(s) of the computing device or the additional computing device, additional audio data user input at the computing device or the additional computing device (e.g., "also tell Jane that the backyard is huge"). In some implementations, the plurality of speech hypotheses may already be loaded at the computing device or the additional computing device when the additional spoken utterance is received at block 452. In some additional or alternative implementations, the plurality of speech hypotheses may be loaded at the computing device and/or the additional computing device in response to the additional spoken utterance being received at block 452. Although FIG. 4 is described herein with respect to receiving the additional spoken utterance, it should be understood that is for the sake of example and is not meant to be limiting. For instance, the user may access the transcription and begin adding terms or phrases to the transcription, and prior misrecognitions may still be corrected using the techniques described herein (e.g., with respect to blocks 460, 462, 464, and 466) and skip blocks 454, 456, and 458.

At block 454, the system processes, using an ASR model, the additional audio data corresponding to the additional spoken utterance to generate a plurality of additional speech hypotheses based on additional values generated using the ASR model. The plurality of additional speech hypotheses can also include, for example, term hypotheses for each term included in the spoken utterance and/or transcription hypotheses that include various combinations of the term hypotheses. Each of the plurality of speech hypotheses may be associated with a respective confidence level. For example, each term hypothesis may be associated with a respective confidence level, and each transcription hypothesis may be associated with a distinct, respective confidence level.

At block 456, the system selects, from among the plurality of additional speech hypotheses, an additional given speech hypothesis predicted to correspond to the additional spoken utterance based on the additional values. In some implementations, the additional values generated using the ASR model may include the respective confidence levels. In some additional or alternative implementations, the additional values generated using the ASR model may be based on a finite state decoding graph generated that includes terms and/or phrases that are predicted to correspond to the spoken utterance (or parts thereof) and the respective confidence levels for the term(s) and/or phrase(s). The given speech hypothesis can be selected based on the respective confidence levels (e.g., select a term hypothesis of "backyard" as intended by the user).

At block 458, the system causes the additional given speech hypothesis to be incorporated as an additional portion of the transcription. For example, the additional portion of the transcription can be appended to the portion of the transcription from block 358A and/or block 368B. At block 460, the system determines whether to modify the given speech hypothesis. The system can determine whether to modify the given speech hypothesis (e.g., selected at block 356A or 356B as corresponding to the spoken utterance (or part(s) thereof)) based on the additional given speech hypothesis incorporated as the additional portion of the transcription and/or based on value(s) associated with the plurality of speech hypotheses loaded at the computing device or the additional computing device (e.g., at block 364A and/or block 362B). If, at an iteration of block 460, the system determines not to modify the given speech hypothesis, then the system can return to block 452. If, at an iteration of block 460, the system determines to modify the given speech hypothesis, then the system can proceed to block 462. At block 462, the system selects an alternate speech hypotheses, from among the plurality of speech hypotheses generated at block 354A, based on at least the additional given speech hypothesis. For example, assume an original spoken utterance of "I like the new house" is received, but "house" is misrecognized as "blouse" and incorporated into the transcription. Further assume an additional spoken utterance (e.g., at the additional computing device and/or during a subsequent dialog session) of "the backyard is huge" is received, and correctly recognized. In this example, the system may determine to modify the "blouse" in the transcription by replacing or supplanting it with the word "house" based on the additional given speech hypothesis being related to the alternate speech hypothesis of "house" (e.g., referencing the "backyard").

At block 464, the system replaces (or supplants) the given speech hypothesis with the alternate speech hypothesis in the transcription. In some implementations, the system automatically replaces the given speech hypothesis with the alternate speech hypothesis in response to the alternate speech hypothesis being selected at block 462. In some additional or alternative implementations, the system may generate prompt(s) that solicit user input to modify the given speech hypothesis with the alternate speech hypothesis. For example, the system can generate a notification that includes a first selectable interface element that, when selected, causes the given speech hypothesis to be replaced with the alternate speech hypothesis and includes a second selectable interface element that, when selected, prevents the given speech hypothesis from being replaced with the alternate speech hypothesis. Modifying the given speech hypothesis is described in more detail herein (e.g., with respect to FIGS. 1, 5A-5C, 6A-6B, and 7A-7B). At block 466, the system causes the computing device or the additional computing device to visually render one or more of the graphical elements that indicate the given speech hypothesis was modified. For example, the system can optionally render an indication that the given speech hypothesis (e.g., "blouse") was replaced with the alternate speech hypothesis (e.g., "house").

Figure 5A:
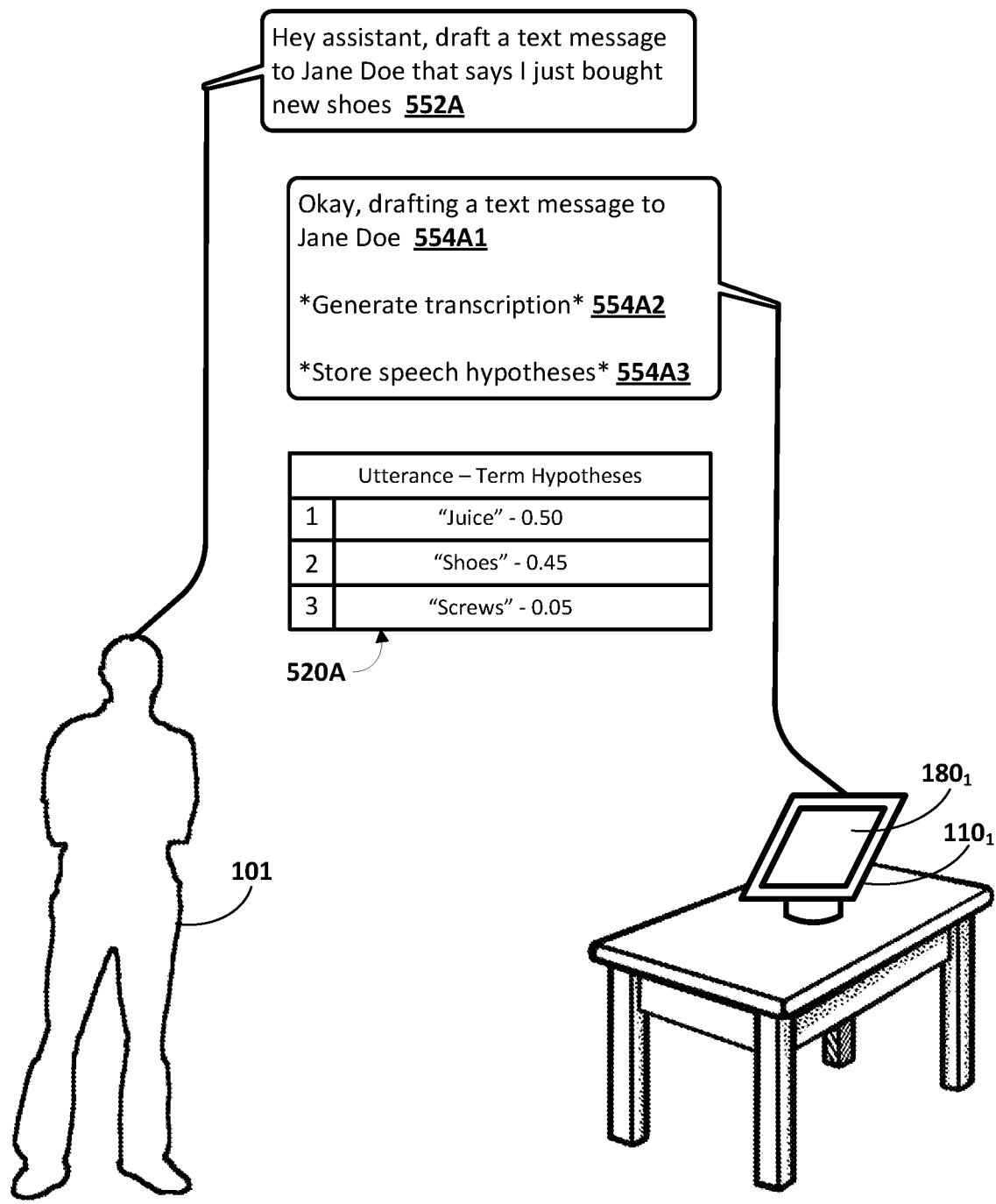
FIGS. 5A, 5B, and 5C depict various non-limiting examples of preserving speech hypotheses across computing devices, in accordance with various implementations.
Figure 5B:
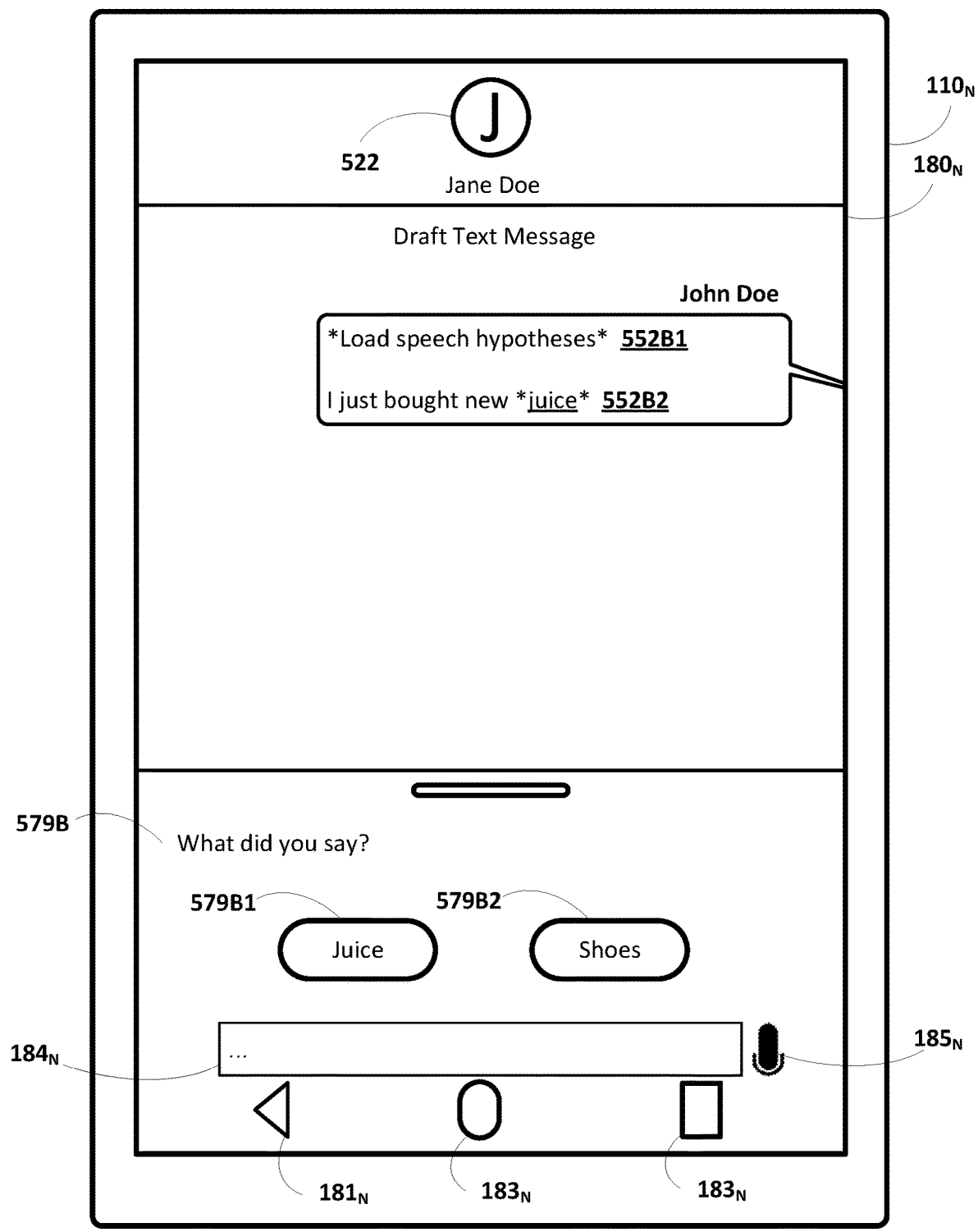
Figure 5C:
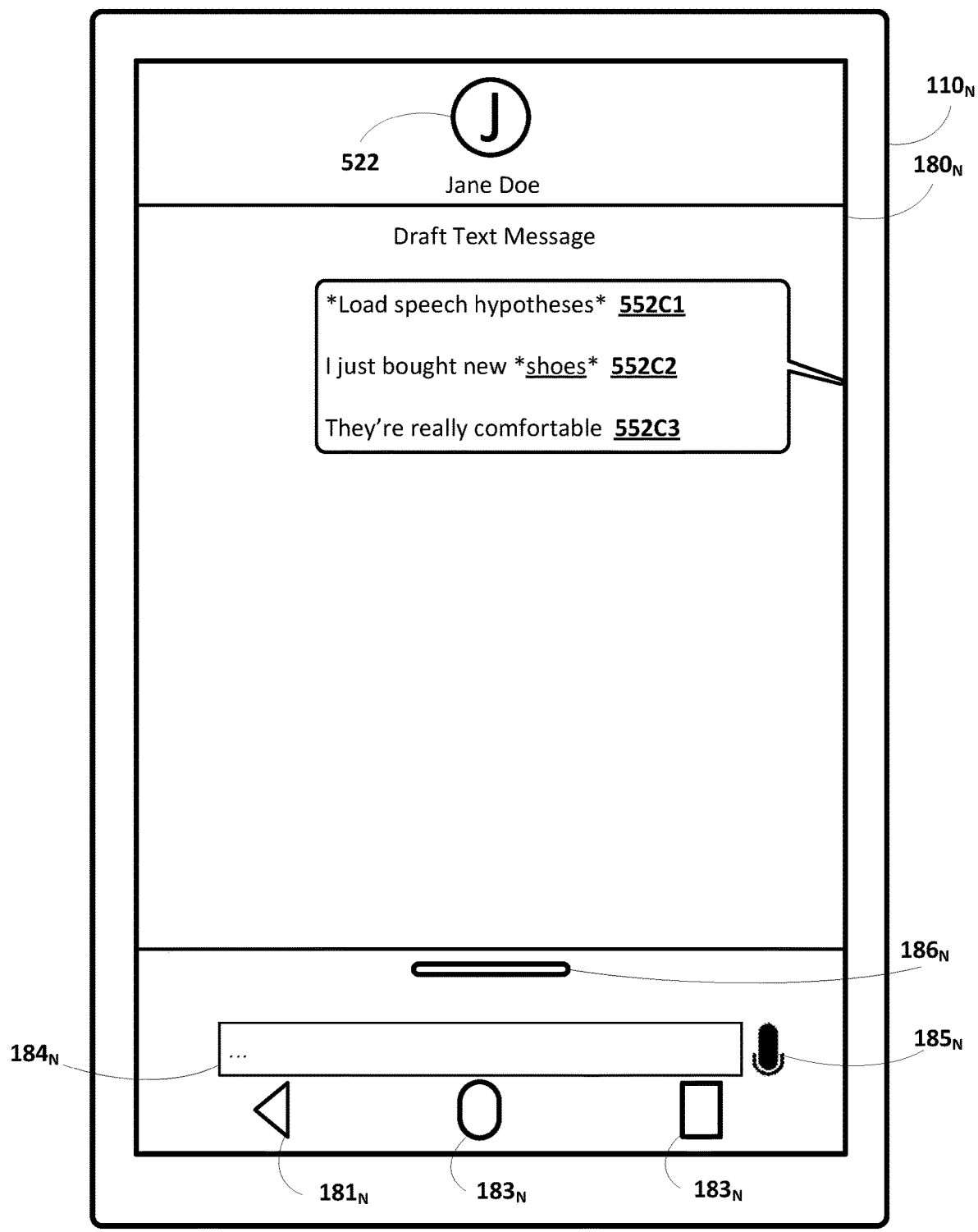

Turning now to FIGS. 5A, 5B, and 5C, various non-limiting examples of preserving speech hypotheses across computing devices $110_{1-N}$ of a user 101 are depicted. As shown, the computing device $110_1$ depicted in FIG. 5A is a standalone computing device having microphone(s) to generate audio data based on spoken utterances and/or other audible input and speaker(s) to audibly render synthesized speech and/or other audible output, and a display $180_1$ to visually render transcriptions and/or other visual output. Further, the computing device $110_N$ depicted in FIGS. 5B and 5C is a mobile device having microphone(s) to generate audio data based on spoken utterances and/or other audible input and speaker(s) to audibly render synthesized speech and/or other audible output, and a display $180_N$ to visually render transcriptions and/or other visual output. However, it should be understood that is for the sake of example and is not meant to be limiting. For instance, the computing devices $110_{1-N}$ may be any combination of a mobile device, a standalone speaker device with a display, a standalone speaker device without a display, a home automation device, a vehicular system, a laptop, a desktop computer, a tablet computer, and/or any other computing device with which the user 101 can interact.

In some implementations, one or more of the computing device $110_{1-N}$ can implement an automated assistant (e.g., the automated assistant 115 of FIG. 1) locally at the computing devices $110_{1-N}$ and/or remotely at one or more servers in communication with the computing devices $110_{1-N}$ over network(s) (e.g., the network(s) 190 of FIG. 1). In some versions of those implementations, the automated assistant may be invoked based on detecting one or more terms or phrases included in a spoken utterance (e.g., "Assistant", "Hey Assistant", and other terms or phrases detected via a hotword detection model), based on detecting the user 101 is gazing at one of the computing devices and begins providing a spoken utterance (e.g., via a gaze detection model), and/or provides any input that otherwise invokes the automated assistant (e.g., a squeeze of one of the computing devices $110_{1-N}$, a selection of a graphical element on the display $180_{1-N}$, or actuation of a hardware button of one of the computing devices $110_{1-N}$).

In some additional or alternative implementations, the automated assistant may be omitted, and the user 101 can interact with one or more graphical elements or hardware buttons to provide spoken utterances without interacting with the automated assistant. For example, the computing device $110_N$ shown in FIGS. 5B and 5C includes a voice entry interface element $185_N$ that the user 101 may select to provide spoken utterances, and audio data corresponding to the spoken utterances can be generated via microphone(s) of the computing device $110_N$. In some implementations, the user 101 may provide spoken utterances without selection of the voice reply interface element $185_N$. For example, active monitoring for spoken utterances may occur to obviate the need for the user to select the voice reply interface element $185_N$. In some additional or alternative implementations, the voice reply interface element $185_N$ may be omitted. Further, the computing device $110_N$ shown in FIGS. 5B and 5C also includes a textual entry interface element $184_N$ that the user 101 may select to provide typed input via a virtual keyboard or other touch and/or typed input, and text corresponding to the typed input can be generated by the computing device $110_N$. In some implementations, the textual reply interface element $184_N$ may additionally and/or alternatively be omitted (e.g., the user 101 may only provide spoken utterances). The display $180_N$ of FIGS. 5B and 5C also includes system interface elements $181_N$, $182_N$, and $183_N$ that may be interacted with by the user 101 to cause the computing device $110_N$ to perform one or more actions.

Referring specifically to FIG. 5A, assume the computing device $110_1$ receives a spoken utterance 552A of "Hey assistant, draft a text message to Jane Doe that says I just bought new shoes" from the user 101. The automated assistant can cause the computing device $110_1$ (and/or a remote system) to process, using ASR model(s), audio data that corresponds to the spoken utterance 552A to generate a plurality of speech hypotheses and respective values associated with each of the plurality of speech hypotheses. The plurality of speech hypotheses can include, for example, transcription hypotheses and/or term hypotheses. For example, assume the automated assistant is highly confident in term hypotheses corresponding to "I", "just", "bought", and "new" based on the values generated using the ASR model(s). However, further assume the automated assistant is not confident in a term hypothesis corresponding to "shoes" based on the values generated using the ASR model(s). For instance, table 520A includes a table of term hypotheses corresponding to "shoes" for the spoken utterance 552A, and respective confidence level associated with each of the term hypotheses as the values generated using the ASR model(s). The table 520A includes a first term hypothesis of "juice" associated with a first probability of 0.50, a second term hypothesis of "shoes" associated with a second probability of 0.45, and a third term hypothesis of "screws" associated with a third probability of 0.05. Although particular term hypotheses are depicted in the table 520A as being associated with particular probabilities, it should be understood that the table 520A is provided for the sake of example and is not meant to be limiting. Further, assume that the automated assistant determines, based on the respective values associated with each of the plurality of term hypotheses, that a part of the spoken utterance 552A that includes "shoes" corresponds to the term hypothesis "juice" as indicated by the table 520A.

Further assume the automated assistant generates and audibly renders, via speaker(s) of the computing device $110_1$, a spoken response 554A1 of "Okay, drafting a text message to Jane Doe", and generates a transcription of "I just bought new juice" as indicated by 554A2. In this example, the transcription can be generated based on the selected transcription hypothesis (e.g., "I just bought new juice") that includes the misrecognized term hypothesis of "juice". The plurality of speech hypotheses (including term hypotheses as shown in the table 520A and/or transcription hypotheses based thereon) can be stored in memory that is accessible by the computing device $110_1$ as indicated by 554A3. In some implementations, the plurality of speech hypotheses may only be stored in the memory in response to determining one or more conditions are satisfied. The one or more conditions can include, for example, determining that multiple of the respective confidence levels for multiple of the plurality of speech hypotheses are within a threshold range of one another (e.g., the respective confidence level of 0.50 for "juice" being within 0.15 of the respective confidence level of 0.45 for "shoes"), determining that none of the respective confidence levels satisfy a threshold confidence level (e.g., the respective confidence levels for both "juice" and "shoes" failing to satisfy a threshold of 0.70), determining that a plurality of speech hypotheses were generated for a spoken utterance (e.g., the transcription itself being generated), determining the software application that is associated with the transcription is deactivated (e.g., closed or operating in the background of the computing device $110_1$), and/or determining that a dialog session between the user 101 of the computing device $110_1$ and the automated assistant is terminated. Further assume that the dialog session between the user 101 and the automated assistant implemented by the computing device $110_1$ is terminated without sending the text message.

Referring specifically to FIG. 5B, assume the user 101 accesses the text messaging application at the computing device $110_N$ to complete the text message to Jane Doe rather than completing the text message during the dialog session of FIG. 5A as indicated by graphical element 522. In this example, the plurality of speech hypotheses (e.g., from the table 520A of FIG. 5A) can be loaded at the computing device $110_N$ as indicated by 552B1 in response to determining that the user 101 accessed the text messaging application accessible by the computing device $110_N$, in response to determining that the user 101 accessed a transcription 552B2 associated with Jane Doe at the text messaging application accessible by the computing device $110_N$, and/or based on other user interactions the computing device $110_N$. In some implementations, and as shown in FIG. 5B, a portion of the transcription 552B2 can be graphically demarcated (e.g., "juice") to indicate that the portion of the transcription 552B2 may include a potential misrecognition. In some additional or alternative implementations, the transcription 552B2 may not be graphically demarcated. However, in some versions of those implementations, the portion of the transcription 552B2 may be graphically demarcated in response to a user interaction directed to the portion of the transcription 552B2 that includes the potential misrecognition. For example, the user 101 can longpress (e.g., hold for a threshold duration of time, such as two seconds or three seconds) the portion of the transcription 552B2, hover over or right-click the portion of the transcription 552B2 (e.g., if the computing device includes a stylus or is a laptop, desktop, or tablet computer), or select a graphical element that, when selected, causes the plurality of speech hypotheses to be presented to the user for selection at the computing device $110_N$. As another example, the user 101 can select the portion of the transcription on the display $180_N$ of the computing device $110_N$ and, and a virtual keyboard can provide the plurality of speech hypotheses that were loaded at the computing device $110_N$.

Moreover, in various implementations, and prior to receiving any additional user input, the computing device $110_N$ can cause a notification 579B to be rendered at the computing device $110_N$ (e.g., via the display $180_N$ or via a separate interface as shown in FIG. 5B). The notification 579B can solicit additional user input to ask the user 101 whether the given speech hypothesis (e.g., "juice") is correct, or whether the user 101 intended an alternate speech hypothesis. For example, the notification 579B can include one or more selectable graphical elements that, when selected, causes the given speech hypothesis to be maintained in the portion of the transcription 552B2 (e.g., a selection of selectable graphical element 579B1 of "juice") or causes the given speech hypothesis to be replaced or supplanted in the portion of the transcription 552B2 with an alternate speech hypothesis that is associated with the selectable graphical element (e.g., a selection of selectable graphical element 579B2 of "shoes"). In some implementations, the notification 579B may not be generated and/or rendered until additional user input directed to the transcription 552B is received (e.g., as described with respect to FIG. 5C).

Referring specifically to FIG. 5C, and similar to FIG. 5B, assume the user accesses the text messaging application at the computing device $110_N$ to complete the text message to Jane Doe rather than completing the text message during the dialog session of FIG. 5A as indicated by graphical element 522. In this example, the plurality of speech hypotheses (e.g., from the table 520A of FIG. 5A) can be loaded at the computing device $110_N$ as indicated by 552C1 in response to determining that the user 101 accessed the text messaging application accessible by the computing device $110_N$, in response to determining that the user 101 accessed a transcription 552C2 associated with Jane Doe at the text messaging application accessible by the computing device $110_N$, and/or based on other user interactions the computing device $110_N$. Further assume that additional user input 552C3 (e.g., typed or spoken) of "They're really comfortable" is received at the computing device $110_N$ prior to the given speech hypothesis being modified (automatically or in response to further user input being received responsive to any prompt(s) soliciting the further user input), thereby resulting in a combined transcription of "I just bought new juice. They're really comfortable".

In various implementations, the given speech hypothesis of "juice" can be modified based on the additional user input 552C3 that is associated with the combined transcription. In some versions of those implementations, the given speech hypothesis of "juice" can be automatically modified with an alternate speech hypothesis of "shoes" based on processing the additional user input 552C3 (e.g., as shown in FIG. 5C). In some additional or alternative versions of those implementations, the prompt(s) that solicit user input (e.g., described with respect to FIG. 5B) to modify the given speech hypothesis of "juice" with the alternate speech hypothesis can be generated and rendered at the computing device $110_N$ in response to receiving the additional user input 553C3. In some versions of those implementations, one or more semantic model(s) or rule(s) can be utilized in determining whether to modify the given speech hypothesis of "juice" with the alternate speech hypothesis of "shoes". For example, the semantic model(s) or rule(s) can process the transcription and/or the plurality of speech hypotheses (or the one or more alternate speech hypotheses) and determine that "shoes" and "comfortable" are more semantically meaningful than "juice" and "comfortable". The modification to the given speech hypothesis can be performed based on this semantic determination.

Although FIGS. 5A-5C are described herein as utilizing particular computing devices $110_{1-N}$, it should be understood that is for the sake of example and is not meant to be limiting. For example, the computing devices $110_{1-N}$ can be any combination of a mobile device, a standalone speaker device with a display, a standalone speaker device without a display, a home automation device, a vehicular system, a laptop, a desktop computer, a tablet computer, and/or any other computing device with which the user 101 can interact as noted above. Further, although FIGS. 5A-5C are described herein with respect to only storing and loading the plurality of speech hypotheses for a given term hypothesis, it should also be understood that is for the sake of example, and is not meant to be limiting. For example, a plurality of respective speech hypotheses for any combination of term hypotheses and/or transcription hypotheses can be stored and/or loaded across the computing devices $110_{1-N}$.

Figure 6A:
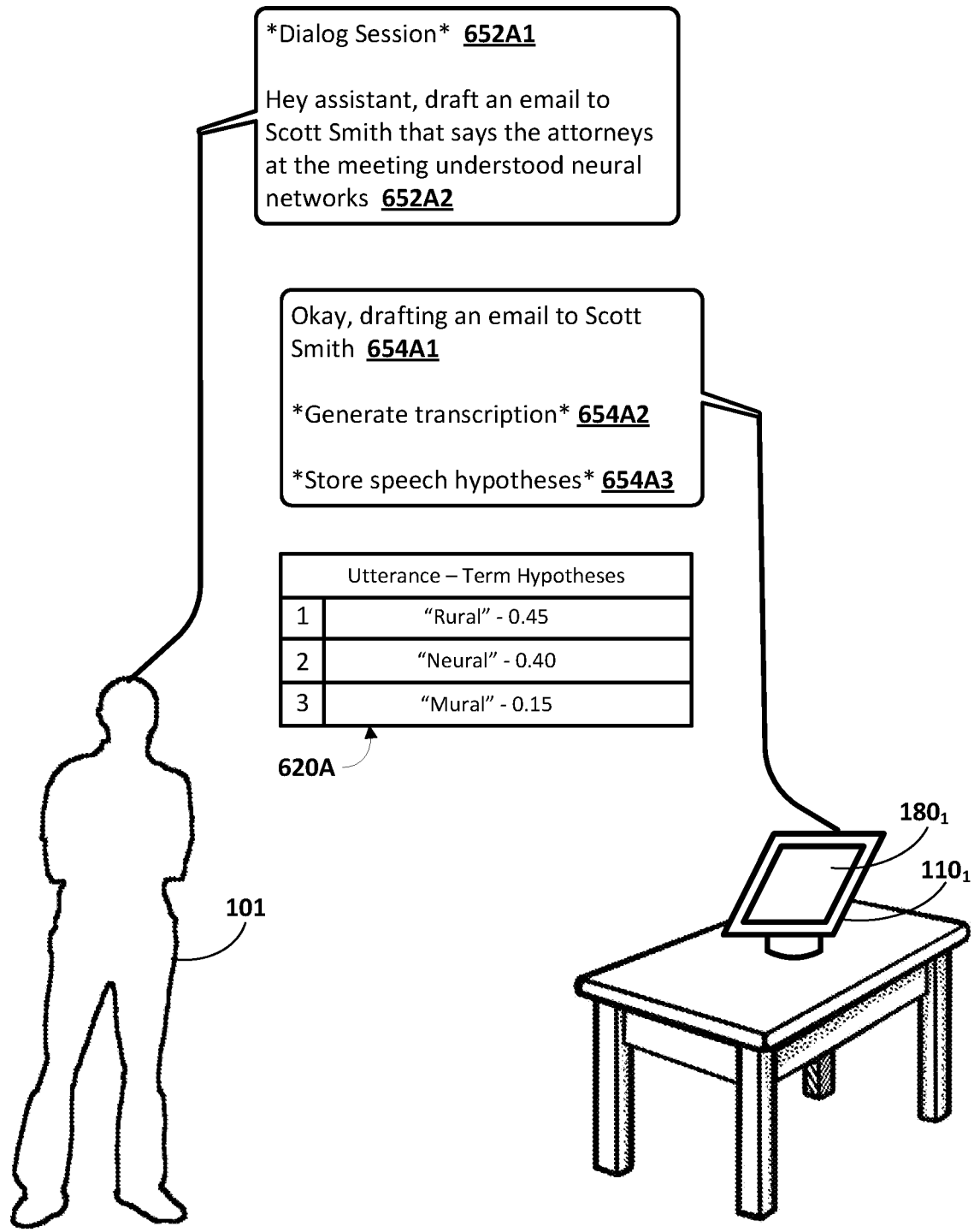
FIGS. 6A and 6B depict various non-limiting examples of preserving speech hypotheses across dialog sessions, in accordance with various implementations.
Figure 6B:
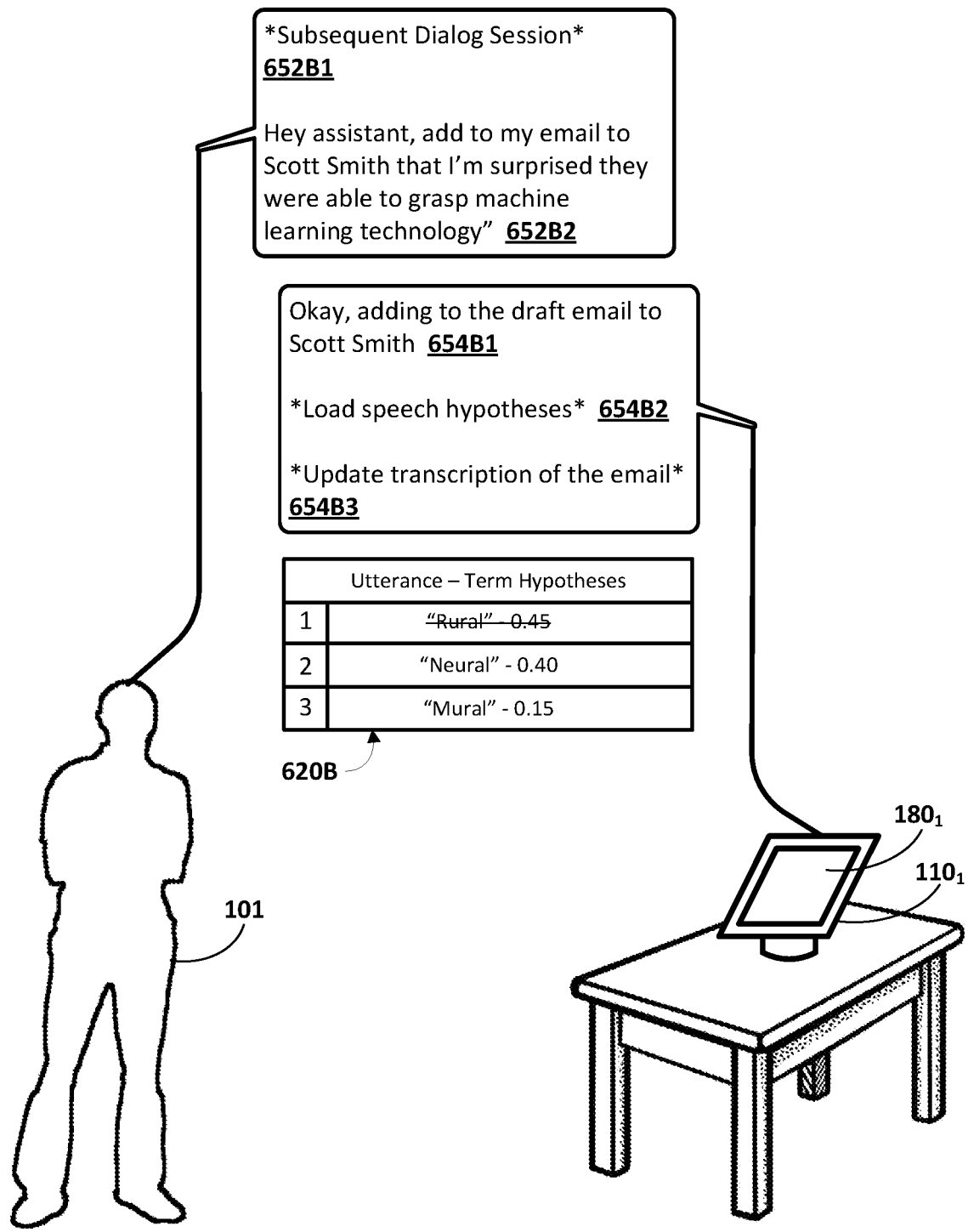

Turning now to FIGS. 6A and 6B, various non-limiting examples of preserving speech hypotheses across dialog sessions of a user 101 are depicted. As shown, the computing device $110_1$ depicted in FIGS. 6A and 6B is the standalone computing device with the same functionality described with respect to FIG. 5A. Notably, FIG. 6A depicts a dialog session (e.g., as indicated by 652A1) with the automated assistant implemented by the computing device $110_1$, and FIG. 6B depicts a subsequent dialog session (e.g., as indicated by 652B1) with the automated assistant implemented by the computing device $110_1$. Despite the distinct dialog sessions with the automated assistant, a plurality of speech hypotheses can be preserved across the dialog sessions.

Referring specifically to FIG. 6A, assume the computing device $110_1$ receives a spoken utterance 652A2 of "Hey assistant, draft an email to Scott Smith that says" from the user 101 to initiate the dialog session as indicated by 652B1 for drafting a transcription of an email that is associated with an email application. The automated assistant can cause the computing device $110_1$ (and/or a remote system) to process, using ASR model(s), audio data that corresponds to the spoken utterance 652A2 to generate a plurality of speech hypotheses and respective values associated with each of the plurality of speech hypotheses. The plurality of speech hypotheses can include, for example, transcription hypotheses and/or term hypotheses. For example, assume the automated assistant is highly confident in term hypotheses corresponding to "the", "attorneys", "at", "the", "meeting", "understood", and "networks" based on the values generated using the ASR model(s). However, further assume the automated assistant is not confident in a term hypothesis corresponding to "neural" based on the values generated using the ASR model(s). For instance, table 620A includes a table of term hypotheses corresponding to "neural" for the spoken utterance 652A2, and respective confidence level associated with each of the term hypotheses as the values generated using the ASR model(s). The table 620A includes a first term hypothesis of "rural" associated with a first probability of 0.45, a second term hypothesis of "neural" associated with a second probability of 0.40, and a third term hypothesis of "mural" associated with a third probability of 0.15. Although particular term hypotheses are depicted in the table 620A as being associated with particular probabilities, it should be understood that the table 620A is provided for the sake of example and is not meant to be limiting. Further, assume that the automated assistant determines, based on the respective values associated with each of the plurality of term hypotheses, that a part of the spoken utterance 652A2 that includes "neural" corresponds to the term hypothesis "rural" as indicated by the table 620A.

Further assume the automated assistant generates and audibly renders, via speaker(s) of the computing device $110_1$, a spoken response 654A1 of "Okay, drafting an email to Scott Smith", and generates a transcription of "the attorneys at the meeting understood rural networks" as indicated by 654A2 (which can rendered be displayed and interacted with via the display $180_1$ of the computing device $110_1$). In this example, the transcription can be generated based on the selected transcription hypothesis (e.g., "the attorneys at the meeting understood rural networks") that includes the misrecognized term hypothesis of "rural". The plurality of speech hypotheses (including term hypotheses as shown in the table 620A and/or transcription hypotheses based thereon) can be stored in memory that is accessible by the computing device $110_1$ as indicated by 654A3. In some implementations, the plurality of speech hypotheses may only be stored in the memory in response to determining one or more conditions are satisfied. The one or more conditions can include, for example, determining that multiple of the respective confidence levels for multiple of the plurality of speech hypotheses are within a threshold range of one another (e.g., the respective confidence level of 0.45 for "rural" being within 0.08 of the respective confidence level of 0.40 for "neural"), determining that none of the respective confidence levels satisfy a threshold confidence level (e.g., the respective confidence levels for both "rural" and "neural" failing to satisfy a threshold of 0.51), determining that a plurality of speech hypotheses were generated for a spoken utterance (e.g., the transcription itself being generated), determining the software application that is associated with the transcription is deactivated (e.g., closed or operating in the background of the computing device $110_1$), and/or determining that a dialog session between the user 101 of the computing device $110_1$ and the automated assistant is terminated. Further assume that the dialog session between the user 101 and the automated assistant implemented by the computing device $110_1$ is terminated without sending the email.

Referring specifically to FIG. 6B, assume the computing device 110 receives an additional spoken utterance 652A2 of "Hey assistant, add to my email to Scott Smith that I'm surprised they were able to grasp machine learning technology" from the user 101 to initiate the subsequent dialog session as indicated by 652B1. In some implementations, the subsequent dialog session of FIG. 6B is temporally distinct from the dialog session of FIG. 6A. For example, the subsequent dialog session of FIG. 6B may occur several hours, days, or weeks after the initial dialog session of FIG. 6A. In some additional or alternative implementations, the subsequent dialog session of FIG. 6B may temporally follow the dialog session of FIG. 6A. For example, the subsequent dialog session of FIG. 6B may occur immediately following the dialog session of FIG. 6A. In other words, the dialog session in this example can be characterized based on user input and a response thereto, and the subsequent dialog session in this example can be characterized based on subsequent user input and a subsequent response thereto. As another example, each time particular words or phrases are utilized that invoke the automated assistant (e.g., detected using a hotword model), the interaction that follows the particular words or phrases may be characterized as a dialog session.

In response to receiving the additional spoken utterance 652B2, the automated assistant can cause the computing device $110_1$ (and/or a remote system) to process, using the ASR model(s), audio data that corresponds to the additional spoken utterance 652B2 to generate a plurality of speech hypotheses and respective values associated with each of the plurality of speech hypotheses. Similar to described above with respect to FIG. 6A, the plurality of speech hypotheses can include, for example, transcription hypotheses and/or term hypotheses. In this example, assume the additional spoken utterance 652B2 is correctly recognized based on the values generated using the ASR model(s) in processing the additional spoken utterance 652B2. Further assume the automated assistant generates and audibly renders, via speaker(s) of the computing device $110_1$, a spoken response 654B1 of "Okay, adding to the draft email to Scott Smith". In this example, the automated assistant can determine that the additional spoken utterance 652B1 is directed to the transcription generated in FIG. 6A. As a result, the automated assistant can load the plurality of speech hypotheses for the transcription as indicated by 654B2. For instance, table 620B includes a table of term hypotheses. Notably, the table 620B of FIG. 6B is similar to the table 620A of FIG. 6A, but omits the term hypotheses of "rural" that was selected as corresponding to "neural" in the original spoken utterance 652A2. In other words, the table 620B of FIG. 6B only includes alternate term hypotheses that were not selected for inclusion in the transcription.

Further, the automated assistant can update the transcription for the email as indicated by 654B3 to include an additional portion that is determined and correctly recognized based on processing the additional spoken utterance 652B2 using the ASR model(s), resulting in a transcription of "The attorneys at the meeting understood rural networks. I'm surprised they were able to grasp machine learning technology". In some implementations, the automated assistant can modify portions of the transcription based on the plurality of speech hypotheses that were loaded at the computing device $110_1$ and/or based on the additional spoken utterance 652B2. For example, the automated assistant can modify the given speech hypothesis of "rural" with an alternate speech hypothesis (e.g., from the table 620B) in response to updating the transcription as indicated by 654B3. In some versions of those implementations, one or more semantic model(s) or rule(s) can be utilized in determining whether to modify the given speech hypothesis of "rural" with the alternate speech hypothesis of "neural", thereby resulting in a transcription that corresponds to the spoken utterance 652A2 and the additional spoken utterance 652B2 and despite the initial misrecognition in initial dialog session. For example, the semantic model(s) or rule(s) can process the transcription and/or the plurality of speech hypotheses (or the one or more alternate speech hypotheses) and determine that "neural networks" and "machine learning technology" are more semantically meaningful than "rural networks" and "machine learning technology". The modification to the given speech hypothesis can be performed based on this semantic determination, and even without the knowledge of the user 101 since the user is engaged in only voice communication with the automated assistant.

Figure 7A:
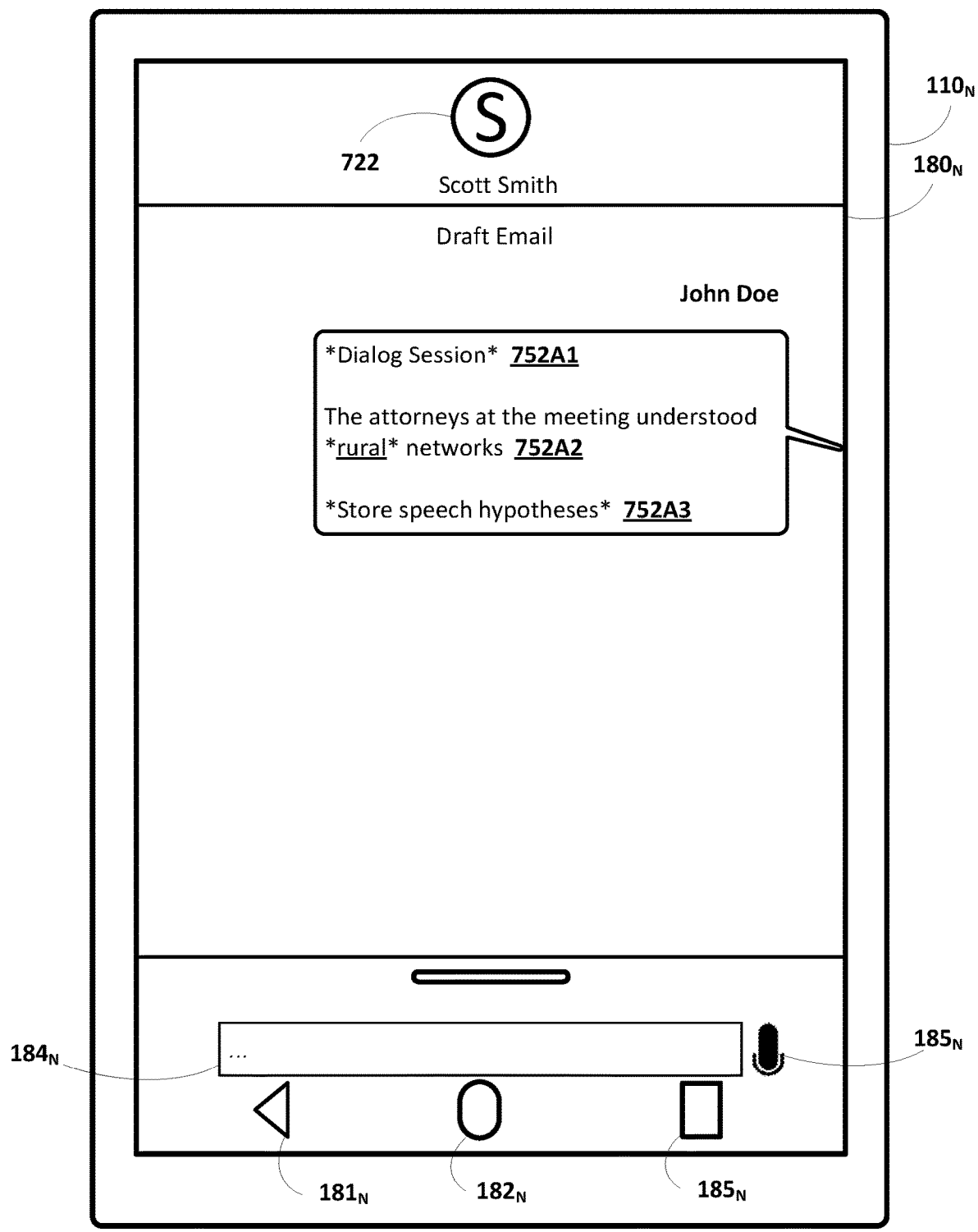
FIGS. 7A and 7B depict additional non-limiting examples of preserving speech hypotheses across dialog sessions, in accordance with various implementations.
Figure 7B:
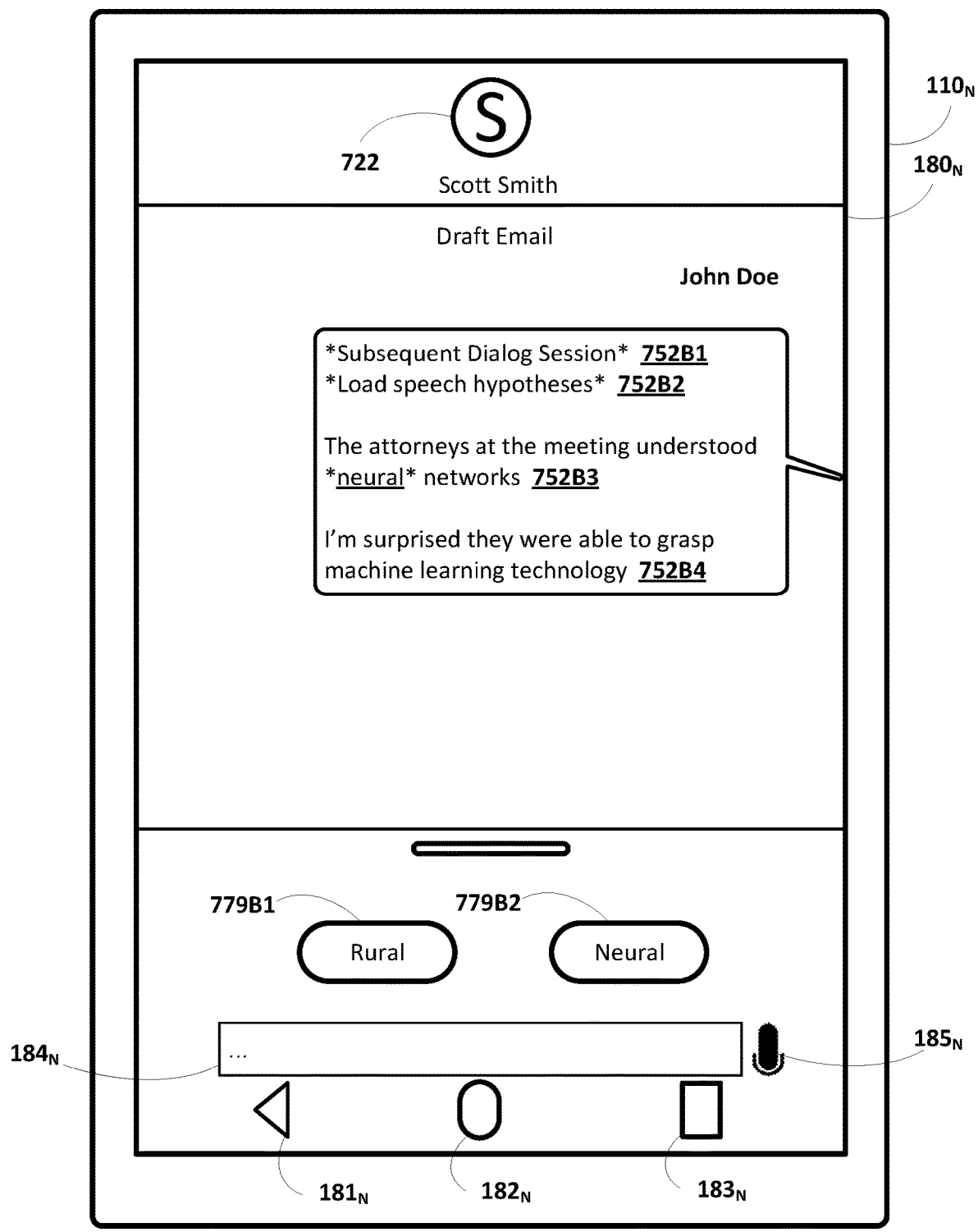

Although FIGS. 6A and 6B are described herein as utilizing the automated assistant in dialog sessions to preserve the speech hypotheses, it should be understood that is for the sake of example and is not meant to be limiting. For example, and referring now to FIGS. 7A and 7B, various non-limiting examples of preserving speech hypotheses across dialog sessions of a user 101 are depicted. As shown, the computing device $110_N$ depicted in FIGS. 7A and 7B is the mobile device with the same functionality described with respect to FIGS. 5B and 5C. Notably, FIGS. 7A and 7B depict the same user interaction across the dialog sessions (e.g., as indicated by 752A1 and 752A2) as described with respect to FIGS. 6A and 6B (e.g., the same draft email to Scott Smith as indicated by 722).

However, and in contrast with FIGS. 6A and 6B, the computing device $110_N$ may receive a spoken utterance 752A2 of the user 101 in response to detecting input for providing spoken utterances and without invoking the automated assistant (e.g., a selection of the voice entry interface element $185_N$) when the email software application is active at the computing device $110_N$. For example, and with respect to FIG. 7A, assume the computing device $110_N$ receives the spoken utterance 752A2, and then the user 101 deactivates the email application without sending a transcription of the email to Scott Smith. The plurality of speech hypotheses (e.g., from the table 620A of FIG. 6A) can be stored in the memory that is accessible by the computing device $110_N$ in response to the email application being deactivated as indicated by 752A3. Nonetheless, when the user subsequently activates the email application to begin the subsequent dialog session as indicated by 752B1, the plurality of speech hypotheses can be loaded at the email application as indicated by 752B2 along with the transcription of the draft email as indicated by 752B3. Further assume that additional user input 752B4 (e.g., typed and/or spoken) is received, processed, and incorporated into the transcription at the computing device $110_N$. In some implementations, alternate speech hypotheses may be presented for selection by the user 101 based on the values associated with the alternate speech hypotheses. For example, and as shown in FIG. 7B, a first selectable graphical element 779B1 of "rural" and a second selectable graphical element 779B2 of "neural" can be presented for selection by the user. These graphical elements may be presented to the user in response to receiving the additional user input 752B4, in response to receiving user input directed to a virtual keyboard, in response to user input directed to the portion of the transcription that includes the potential misrecognition (e.g., "rural"), and/or in response to other user interactions described herein (e.g., with respect to modification engine 152 of FIG. 1). In other implementations, the transcription may be automatically modified based on alternate speech hypotheses in response to receiving the additional user input (e.g., as described with respect to FIG. 6B).

Although FIGS. 6A-7B are described herein as utilizing particular computing devices $110_{1-N}$, it should be understood that is for the sake of example and is not meant to be limiting. For example, the computing devices $110_{1-N}$ can be any combination of a mobile device, a standalone speaker device with a display, a standalone speaker device without a display, a home automation device, a vehicular system, a laptop, a desktop computer, a tablet computer, and/or any other computing device with which the user 101 can interact as noted above. Further, although FIGS. 6A-7B are described herein with respect to only storing and loading the plurality of speech hypotheses for a given term hypothesis, it should also be understood that is for the sake of example, and is not meant to be limiting. For example, a plurality of respective speech hypotheses for any combination of term hypotheses and/or transcription hypotheses can be stored and/or loaded across the computing devices $110_{1-N}$.

Figure 8:
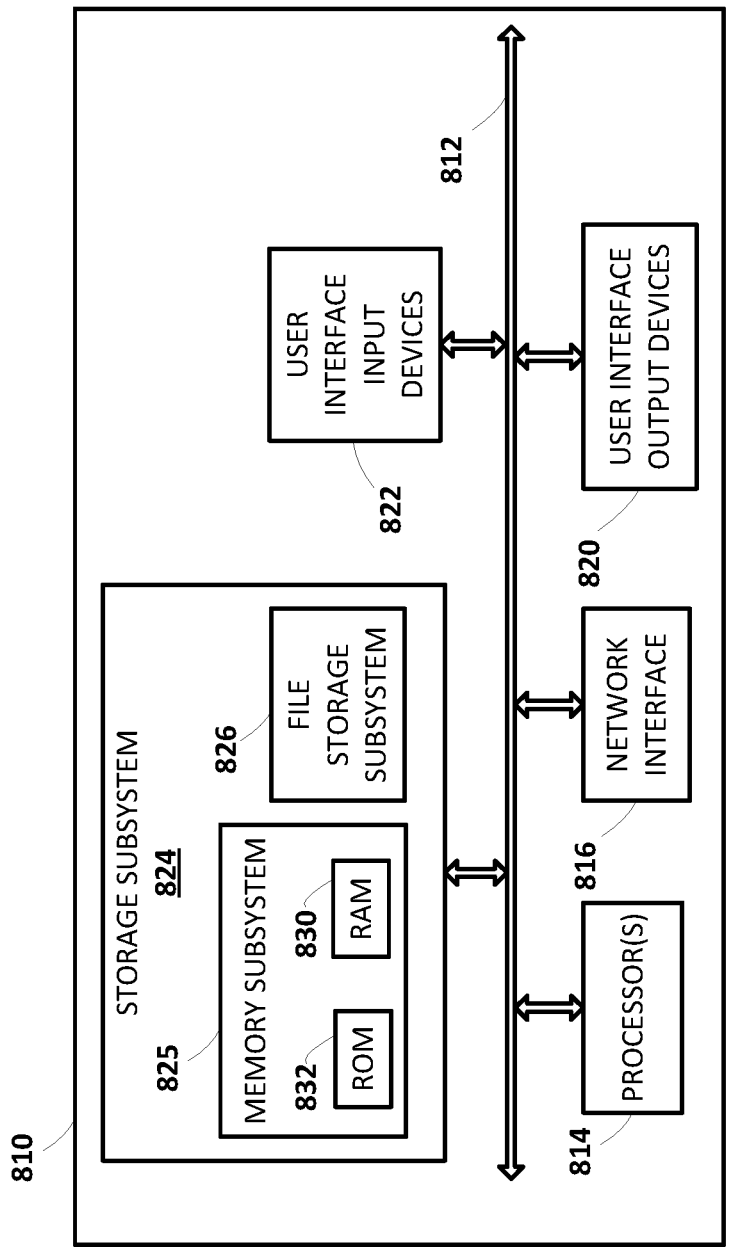
FIG. 8 depicts an example architecture of a computing device, in accordance with various implementations.

Turning now to FIG. 8, is a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, via one or more microphones of a computing device of a user, audio data corresponding to a spoken utterance of the user; processing, using an automatic speech recognition (ASR) model, the audio data corresponding to the spoken utterance to generate, for one or more parts of the spoken utterance, a plurality of speech hypotheses based on values generated using the ASR model; selecting, from among the plurality of speech hypotheses, a given speech hypothesis, the given speech hypothesis being predicted to correspond to one or more of the parts of the spoken utterance based on the values; causing the given speech hypothesis to be incorporated as a portion of a transcription, the transcription being associated with a software application that is accessible by at least the computing device, and the transcription being visually rendered at a user interface of the computing device of the user; storing the plurality of speech hypotheses in memory that is accessible by at least the computing device; and transmitting the plurality of speech hypotheses. Transmitting the plurality of speech hypotheses causes the plurality of speech hypotheses to be loaded at an additional computing device of the user when the transcription associated with the software application is accessed at the additional computing device, the additional computing device being in addition to the computing device.

These and other implementations of technology disclosed herein can optionally include one or more of the following features.

In some implementations, the method may further include determining a respective confidence level associated with each of the plurality of speech hypotheses, for one or more of the parts of the spoken utterance, based on the values generated using the ASR model. Selecting the given speech hypothesis, from among the plurality of speech hypotheses, predicted to correspond to one or more of the parts of the spoken utterance may be based on the respective confidence level associated with each of the plurality of speech hypotheses.

In some versions of those implementations, storing the plurality of speech hypotheses in the memory that is accessible by at least the computing device may be in response to determining that the respective confidence level for two or more of the plurality of speech hypotheses, for one or more of the part of the spoken utterance, are within a threshold range of confidence levels.

In some additional or alternative versions of those implementations, storing the plurality of speech hypotheses in the memory that is accessible by at least the computing device may be in response to determining that the respective confidence level for each of the plurality of speech hypotheses, for the part of the spoken utterance, fail to satisfy a threshold confidence level. In some further versions of those implementations, the method may further include graphically demarcating the portion of the transcription that includes the part of the spoken utterance corresponding to the given speech hypothesis. Graphically demarcating the portion of the transcription may be in response to determining that the respective confidence level for each of the plurality of speech hypotheses, for the part of the spoken utterance, fail to satisfy a threshold confidence level. In yet further versions of those implementations, graphically demarcating the portion of the transcription that includes the part of the spoken utterance corresponding to the given speech hypothesis may include one or more of: highlighting the portion of the transcription, underlining the portion of the transcription, italicizing the portion of the transcription, or providing a selectable graphical element that, when selected, causes one or more additional speech hypotheses, from among the plurality of speech hypotheses, and that are in addition to the given speech hypothesis, to be visually rendered along with the portion of the transcription.

In some additional or alternative versions of those implementations, storing the plurality of speech hypotheses in the memory that is accessible by at least the computing device may include storing each the plurality of speech hypotheses in association with the respective confidence level in the memory that is accessible by at least the computing device.

In some additional or alternative versions of those implementations, the method may further include receiving, via one or more additional microphones of the additional computing device, additional audio data corresponding to an additional spoken utterance of the user; processing, using the ASR model, the additional audio data corresponding to the additional spoken utterance to generate, for an additional part of the additional spoken utterance, a plurality of additional speech hypotheses based on additional values generated using the ASR model; and modifying the given speech hypothesis, for the part of the spoken utterance, incorporated as the portion of the transcription based on the plurality of additional speech hypotheses. In some further versions of those implementations, modifying the given speech hypothesis incorporated as the portion of the transcription based on the plurality of additional speech hypotheses may include selecting an alternate speech hypothesis, from among the plurality of speech hypotheses, based on the respective confidence level associated with each of the plurality of speech hypotheses and based on the plurality of additional speech hypotheses; and replacing the given speech hypothesis with the alternate speech hypothesis, for one or more of the parts of the spoken utterance, in the transcription. In yet further versions of those implementations, the method may further include selecting, from among one or more of the additional speech hypotheses, an additional given speech hypothesis, the additional given speech hypothesis being predicted to correspond to one or more of the additional parts of the additional spoken utterance; and causing the additional given speech hypothesis to be incorporated as an additional portion of the transcription, wherein the additional portion of the transcription positionally follows the portion of the transcription.

In some implementations, the method may further include generating a finite state decoding graph that includes a respective confidence level associated with each of the plurality of speech hypotheses based on the values generated using the ASR model. Selecting the given speech hypothesis, from among the plurality of speech hypotheses, may be based on the finite state decoding graph.

In some versions of those implementations, storing the plurality of speech hypotheses in the memory that is accessible by at least the computing device may include storing the finite state decoding graph in the memory that is accessible by at least the computing device.

In some additional or alternative versions of those implementations, the method may further include receiving, via one or more additional microphones of the additional computing device, additional audio data corresponding to an additional spoken utterance of the user; processing, using the ASR model, the additional audio data corresponding to the additional spoken utterance to generate one or more additional speech hypotheses based on additional values generated using the ASR model; and modifying the given speech hypothesis, for one or more of the parts of the spoken utterance, incorporated as the portion of the transcription based on one or more of the additional speech hypotheses.

In some further versions of those implementations, modifying the given speech hypothesis incorporated as the portion of the transcription based on one or more of the additional speech hypotheses may include adapting the finite state decoding graph based on one or more of the additional speech hypotheses to select an alternate speech hypothesis from among the plurality of speech hypotheses; and replacing the given speech hypothesis with the alternate speech hypothesis, for one or more of the parts of the spoken utterance, in the transcription.

In some additional or alternative versions of those further implementations, the method may further include selecting, from among one or more of the additional speech hypotheses, an additional given speech hypothesis, the additional given speech hypothesis being predicted to correspond to an additional portion of the additional spoken utterance; and causing the additional given speech hypothesis to be incorporated as an additional portion of the transcription, wherein the additional portion of the transcription positionally follows the portion of the transcription.

In some additional or alternative versions of those further implementations, the method may further include causing the computing device to visually render on or more graphical elements that indicate the given speech hypothesis, for one or more of the parts of the spoken utterance, was modified.

In some implementations, the software application may be one or more of: an automated assistant application, a text messaging application, an email application, a notes application, a dictation application, a reminders application, a document editing application, a presentation application, a spreadsheet application, a social media application, a browser application, or a calendar application.

In some implementations, transmitting the plurality of speech hypotheses may include, subsequent to causing the given speech hypothesis to be incorporated as the portion of the transcription associated with the software application, determining the transcription associated with the software application is accessed at the additional computing device; and causing the plurality of speech hypotheses, for one or more of the parts of the spoken utterance, to be transmitted to the additional computing device and from the memory that is accessible by at least the computing device. In some versions of those implementations, the software application may be associated with a third-party system, and causing the plurality of speech hypotheses to be transmitted to the additional computing device may include transmitting the plurality of speech hypotheses to the third-party system.

In some implementations, the memory that is accessible by at least the computing device may include one or more of: on-device memory of the computing device, or remote memory of a remote system.

In some implementations, a method implemented by one or more processors is provided, and includes receiving, via one or more microphones of a computing device of a user, audio data corresponding to a spoken utterance of the user; processing, using an automatic speech recognition (ASR) model, the audio data corresponding to the spoken utterance to generate, for one or more parts of the spoken utterance, a plurality of speech hypotheses based on values generated using the ASR model; selecting, from among the plurality of speech hypotheses, a given speech hypothesis, the given speech hypothesis being predicted to correspond to one or more of the parts of the spoken utterance based on the values; causing the given speech hypothesis to be incorporated as a portion of a transcription, the transcription being visually rendered at a user interface of the computing device of the user; determining that the spoken utterance is complete; in response to determining that the spoken utterance is complete, storing one or more alternate speech hypotheses in memory that is accessible by the computing device, the one or more of alternate speech hypotheses including a subset of the plurality of speech hypotheses that excludes at least the given speech hypothesis; receiving, via one or more of the microphones of the computing device, additional audio data corresponding to an additional spoken utterance of the user; in response to receiving the additional audio data, loading one or more of the alternate speech hypotheses from the memory that is accessible by the computing device; causing an additional given speech hypothesis to be incorporated as an additional portion of the transcription; and modifying, based on the additional given speech hypothesis, the portion of the transcription predicted to correspond to one or more of the parts of the spoken utterance to include a given alternate speech hypothesis, from among the one or more alternate speech hypotheses. The additional given speech hypothesis is selected, from among one or more additional speech hypotheses predicted to correspond to one or more additional parts of the additional spoken utterance.

These and other implementations of technology disclosed herein can optionally include one or more of the following features.

In some implementations, the method may further include processing, using the ASR model, the additional audio data corresponding to the additional spoken utterance to generate, for one or more of the additional parts of the additional spoken utterance, one or more of the additional speech hypotheses based on additional values generated using the ASR model; and selecting, from among one or more of the additional speech hypotheses, the additional given speech hypothesis, the additional given speech hypothesis being predicted to correspond to one or more of the additional parts of the additional spoken utterance.

In some implementations, a method implemented by one or more processors is provided, and includes receiving, via one or more microphones of a computing device of a user, audio data corresponding to a spoken utterance of the user; processing, using an automatic speech recognition (ASR) model, the audio data corresponding to the spoken utterance to generate, for one or more parts of the spoken utterance, a plurality of speech hypotheses based on values generated using the ASR model; selecting, from among the plurality of speech hypotheses, a given speech hypothesis, the given speech hypothesis being predicted to correspond to one or more of the parts of the spoken utterance based on the values; causing the given speech hypothesis to be incorporated as a portion of a transcription, the transcription being associated with a software application that is accessible by at least the computing device, and the transcription being visually rendered at a user interface of the computing device of the user; and storing the plurality of speech hypotheses in memory that is accessible by at least the computing device. Storing the plurality of speech hypotheses in memory that is accessible by at least the computing device causes, in response to the software application being deactivated and subsequently activated at the computing device of the user, the software application to load the plurality of speech hypotheses.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors of a computing device of a user, the method comprising:
receiving, via one or more microphones of the computing device of the user, first audio data corresponding to a first spoken utterance of the user;

processing, using a corresponding on-device automatic speech recognition (ASR) model that is stored in on-device memory of the computing device, the first audio data corresponding to the first spoken utterance to generate, for a given first part of the first spoken utterance, a plurality of first speech hypotheses based on first values generated using the corresponding on-device ASR model that is stored in the on-device memory of the computing device;

selecting, from among the plurality of first speech hypotheses, a given first speech hypothesis, the given first speech hypothesis being predicted to correspond to the given first part of the first spoken utterance based on the first values;

causing the given first speech hypothesis to be incorporated as a first portion of a transcription, the transcription being visually rendered at a user interface of the computing device of the user;

determining that the first spoken utterance is complete;

in response to determining that the first spoken utterance is complete, storing one or more first alternate speech hypotheses in the on-device memory of the computing device, the one or more first alternate speech hypotheses including a subset of the plurality of first speech hypotheses that excludes at least the given first speech hypothesis;

receiving, via one or more of the microphones of the computing device, second audio data corresponding to a second spoken utterance of the user; and in response to receiving the second audio data:
  loading one or more of the first alternate speech hypotheses from the on-device memory of the computing device;
  processing, using the corresponding on-device ASR model that is stored in on-device memory of the computing device, the second audio data corresponding to the second spoken utterance to generate, for a given second part of the second spoken utterance, a plurality of second speech hypotheses based on second values generated using the corresponding on-device ASR model that is stored in the on-device memory of the computing device;
  selecting, from among the plurality of second speech hypotheses, a given second speech hypothesis, the given second speech hypothesis being predicted to correspond to the given second part of the second spoken utterance based on the second values;
  causing the given second speech hypothesis to be incorporated as a second portion of the transcription;
  determining, based on the given second speech hypothesis that is incorporated into the transcription as the second portion of the transcription, whether to modify the first portion of the transcription; and
  in response to determining to modify the first portion of the transcription:
    modifying the first portion of the transcription, that was initially predicted to correspond to the given first part of the first spoken utterance, to include a given alternate first speech hypothesis, from among the one or more alternate first speech hypotheses, that is subsequently predicted to correspond to the given first part of the first spoken utterance.

2. The method of claim 1, wherein modifying the first portion of the transcription to include the given alternate first speech hypothesis comprises:

supplanting, in the transcription that is visually rendered at the user interface of the client device, the given first speech hypothesis with the given alternate first speech hypothesis.

3. The method of claim 2, wherein supplanting the given first speech hypothesis with the given alternate first speech hypothesis comprises:
  automatically supplanting, in the transcription that is visually rendered at the user interface of the client device, the given first speech hypothesis with the given alternate first speech hypothesis.

4. The method of claim 2, wherein supplanting the given first speech hypothesis with the given alternate first speech hypothesis comprises:
  generating a prompt that solicits user input to modify the given first speech hypothesis with the given alternate first speech hypothesis;
  causing the prompt to be visually rendered at the user interface of the client device; and
  in response to receiving the user input to modify the given first speech hypothesis with the given alternate first speech hypothesis:
    supplanting, in the transcription that is visually rendered at the user interface of the client device, the given first speech hypothesis with the given alternate first speech hypothesis.

5. The method of claim 1, wherein determining to modify the first portion of the first portion of the transcription comprises:
  determining that the given alternate first speech hypothesis is semantically related to the given second speech hypothesis.

6. The method of claim 5, wherein the given alternate first speech hypothesis is identified, from among the one or more alternate first speech hypotheses, based on it being semantically related to the given second speech hypothesis.

7. A computing device of a user, the computing device comprising:
  one or more hardware processors; and
  on-device memory storing at least instructions that, when executed by the one or more hardware processors, cause the one or more hardware processors to:
    receive, via one or more microphones of the computing device, first audio data corresponding to a first spoken utterance of the user;
    process, using a corresponding on-device automatic speech recognition (ASR) model that is stored in the on-device memory of the computing device, the first audio data corresponding to the first spoken utterance to generate, for a given first part of the first spoken utterance, a plurality of first speech hypotheses based on first values generated using the corresponding on-device ASR model that is stored in the on-device memory of the computing device;
    select, from among the plurality of first speech hypotheses, a given first speech hypothesis, the given first speech hypothesis being predicted to correspond to the given first part of the first spoken utterance based on the first values;
    cause the given first speech hypothesis to be incorporated as a first portion of a transcription, the transcription being visually rendered at a user interface of the computing device of the user;
    determine that the first spoken utterance is complete;
    in response to determining that the first spoken utterance is complete, store one or more first alternate speech hypotheses in the on-device memory of the computing device, the one or more first alternate speech hypotheses including a subset of the plurality of first speech hypotheses that excludes at least the given first speech hypothesis;

receive, via one or more of the microphones of the computing device, second audio data corresponding to a second spoken utterance of the user; and in response to receiving the second audio data:

load one or more of the first alternate speech hypotheses from the on-device memory of the computing device;

process, using the corresponding on-device ASR model that is stored in the on-device memory of the computing device, the second audio data corresponding to the second spoken utterance to generate, for a given second part of the second spoken utterance, a plurality of second speech hypotheses based on second values generated using the corresponding on-device ASR model that is stored in the on-device memory of the computing device;

select, from among the plurality of second speech hypotheses, a given second speech hypothesis, the given second speech hypothesis being predicted to correspond to the given second part of the second spoken utterance based on the second values;

cause the given second speech hypothesis to be incorporated as a second portion of the transcription;

determine, based on the given second speech hypothesis that is incorporated into the transcription as the second portion of the transcription, whether to modify the first portion of the transcription; and in response to determining to modify the first portion of the transcription:

modify the first portion of the transcription, that was initially predicted to correspond to the given first part of the first spoken utterance, to include a given alternate first speech hypothesis, from among the one or more alternate first speech hypotheses, that is subsequently predicted to correspond to the given first part of the first spoken utterance.

8. The computing device of claim 7, wherein the instructions to modify the first portion of the transcription to include the given alternate first speech hypothesis comprise instructions to:

supplant, in the transcription that is visually rendered at the user interface of the client device, the given first speech hypothesis with the given alternate first speech hypothesis.

9. The computing device of claim 8, wherein the instructions to supplant the given first speech hypothesis with the given alternate first speech hypothesis comprise instructions to:

automatically supplant, in the transcription that is visually rendered at the user interface of the client device, the given first speech hypothesis with the given alternate first speech hypothesis.

10. The computing device of claim 8, wherein the instructions to supplant the given first speech hypothesis with the given alternate first speech hypothesis comprise instructions to:

generate a prompt that solicits user input to modify the given first speech hypothesis with the given alternate first speech hypothesis;

cause the prompt to be visually rendered at the user interface of the client device; and in response to receiving the user input to modify the given first speech hypothesis with the given alternate first speech hypothesis:

supplant, in the transcription that is visually rendered at the user interface of the client device, the given first speech hypothesis with the given alternate first speech hypothesis.

11. The computing device of claim 7, wherein the instructions to determine to modify the first portion of the first portion of the transcription comprise instructions to:

determine that the given alternate first speech hypothesis is semantically related to the given second speech hypothesis.

12. The computing device of claim 11, wherein the given alternate first speech hypothesis is identified, from among the one or more alternate first speech hypotheses, based on it being semantically related to the given second speech hypothesis.

13. A system, the system comprising:

one or more hardware processors; and memory storing at least instructions that, when executed by the one or more hardware processors, cause the one or more hardware processors to:

receive, via one or more microphones of a computing device of a user, first audio data corresponding to a first spoken utterance of the user;

process, using a corresponding on-device automatic speech recognition (ASR) model that is stored in the on-device memory of the computing device, the first audio data corresponding to the first spoken utterance to generate, for a given first part of the first spoken utterance, a plurality of first speech hypotheses based on first values generated using the corresponding on-device ASR model that is stored in the on-device memory of the computing device;

select, from among the plurality of first speech hypotheses, a given first speech hypothesis, the given first speech hypothesis being predicted to correspond to the given first part of the first spoken utterance based on the first values;

cause the given first speech hypothesis to be incorporated as a first portion of a transcription, the transcription being visually rendered at a user interface of the computing device of the user;

determine that the first spoken utterance is complete;

in response to determining that the first spoken utterance is complete, store one or more first alternate speech hypotheses in the on-device memory of the computing device, the one or more first alternate speech hypotheses including a subset of the plurality of first speech hypotheses that excludes at least the given first speech hypothesis;

receive, via one or more of the microphones of the computing device, second audio data corresponding to a second spoken utterance of the user; and in response to receiving the second audio data:

load one or more of the first alternate speech hypotheses from the on-device memory of the computing device;

process, using the corresponding on-device ASR model that is stored in the on-device memory of the computing device, the second audio data corresponding to the second spoken utterance to generate, for a-given second part of the second spoken utterance, a plurality of second speech hypotheses based on second values generated using the corresponding on-device ASR model that is stored in the on-device memory of the computing device;

select, from among the plurality of second speech hypotheses, a given second speech hypothesis, the given second speech hypothesis being predicted to correspond to the given second part of the second spoken utterance based on the second values;

cause the given second speech hypothesis to be incorporated as a second portion of the transcription;

determine, based on the given second speech hypothesis that is incorporated into the transcription as the second portion of the transcription, whether to modify the first portion of the transcription; and in response to determining to modify the first portion of the transcription:

modify the first portion of the transcription, that was initially predicted to correspond to the given first part of the first spoken utterance, to include a given alternate first speech hypothesis, from among the one or more alternate first speech hypotheses, that is subsequently predicted to correspond to the given first part of the first spoken utterance.

14. The system of claim 13, wherein the instructions to modify the first portion of the transcription to include the given alternate first speech hypothesis comprise instructions to:

supplant, in the transcription that is visually rendered at the user interface of the client device, the given first speech hypothesis with the given alternate first speech hypothesis.

15. The system of claim 14, wherein the instructions to supplant the given first speech hypothesis with the given alternate first speech hypothesis comprise instructions to:

automatically supplant, in the transcription that is visually rendered at the user interface of the client device, the given first speech hypothesis with the given alternate first speech hypothesis.

16. The system of claim 14, wherein the instructions to supplant the given first speech hypothesis with the given alternate first speech hypothesis comprise instructions to:

generate a prompt that solicits user input to modify the given first speech hypothesis with the given alternate first speech hypothesis;

cause the prompt to be visually rendered at the user interface of the client device; and in response to receiving the user input to modify the given first speech hypothesis with the given alternate first speech hypothesis:

supplant, in the transcription that is visually rendered at the user interface of the client device, the given first speech hypothesis with the given alternate first speech hypothesis.

17. The system of claim 13, wherein the instructions to determine to modify the first portion of the first portion of the transcription comprise instructions to:

determine that the given alternate first speech hypothesis is semantically related to the given second speech hypothesis.

18. The system of claim 17, wherein the given alternate first speech hypothesis is identified, from among the one or more alternate first speech hypotheses, based on it being semantically related to the given second speech hypothesis.

* * * * *